US012572863B2

(12) United States Patent
Armen et al.

(10) Patent No.: US 12,572,863 B2
(45) Date of Patent: Mar. 10, 2026

(54) WORK DISTRIBUTION PLATFORM WITH DYNAMIC ORDER-WORKER MATCHING SYSTEMS

(71) Applicant: Shipt, Inc., Birmingham, AL (US)

(72) Inventors: Alan McGinnis Armen, Seattle, WA (US); Johanna Yuan He, Glendale, CA (US); Vishal Kapoor, San Francisco, CA (US); Richard Emil Biga, Saint Paul, MN (US); Andreea Popescu, Atlanta, GA (US)

(73) Assignee: Shipt, Inc., Birmingham, AL (US)

( * ) Notice: Subject to any disclaimer, the term of this patent is extended or adjusted under 35 U.S.C. 154(b) by 189 days.

(21) Appl. No.: 18/466,182

(22) Filed: Sep. 13, 2023

(65) Prior Publication Data
US 2025/0086540 A1      Mar. 13, 2025

(51) Int. Cl.
*G06Q 10/0631* (2023.01)
*G06Q 30/0283* (2023.01)

(52) U.S. Cl.
CPC . *G06Q 10/063118* (2013.01); *G06Q 30/0283* (2013.01)

(58) Field of Classification Search
CPC ... G06Q 10/063118; G06Q 10/063112; G06Q 30/0283
See application file for complete search history.

(56) References Cited

U.S. PATENT DOCUMENTS 7,555,445 B2      6/2009  Moya et al.
7,809,611 B2     10/2010  Banbury et al.

7,953,655 B1      5/2011  Brewer
8,458,045 B1      6/2013  Chan
2003/0069825 A1   4/2003  Hoffman et al.
2013/0096968 A1*  4/2013  Van Pelt .......... G06Q 10/06398
                                                          705/7.13
2014/0012695 A1   1/2014  Tuohimaa et al.
2020/0410864 A1* 12/2020  Ripert ..................... G08G 1/20
2022/0092519 A1*  3/2022  Hunter ........... G06Q 10/063114

(Continued)

FOREIGN PATENT DOCUMENTS

WO        2007100797 A2      9/2007
WO        2018067360 A1      4/2018

(Continued)

OTHER PUBLICATIONS

Bidbud Launches New Mobile App for the Gig Economy that Allows Workers to Place Bids on Posted Jobs, Business Wire (Sep. 15, 2020).

(Continued)

*Primary Examiner* — Dylan C White
(74) *Attorney, Agent, or Firm* — Merchant & Gould P.C.

(57) ABSTRACT

A work distribution platform is disclosed that is coupled with client devices associated with workers. The work distribution may include matching systems to match workers with orders. An example matching system is a worker offering system, with which the work distribution platform provides orders to workers so that the workers may submit offers to perform the order. The work distribution platform may include a plurality of matching systems, each of which may perform a different process for matching orders with workers and each of which may be used by the work distribution platform.

20 Claims, 10 Drawing Sheets

(56)     References Cited

U.S. PATENT DOCUMENTS

| | | | |
|---|---|---|---|
| 2024/0005240 A1 * | 1/2024 | Han | G06Q 10/06315 |
| 2024/0005284 A1 * | 1/2024 | Han | G06Q 30/06 |
| 2024/0104454 A1 * | 3/2024 | Khang | G06Q 10/1053 |
| 2024/0220893 A1 * | 7/2024 | Cooks | G06Q 10/06316 |
| 2024/0220894 A1 * | 7/2024 | Cooks | G06Q 10/06316 |
| 2025/0285045 A1 * | 9/2025 | Selvam | G06Q 30/0635 |
| 2025/0299233 A1 * | 9/2025 | Kharbat | G06Q 30/0601 |

FOREIGN PATENT DOCUMENTS

| | | | | |
|---|---|---|---|---|
| WO | WO-2023031662 A1 * | 3/2023 | | G06Q 20/085 |
| WO | WO-2023074966 A1 * | 5/2023 | | G06Q 10/06311 |
| WO | WO-2023204356 A1 * | 10/2023 | | G06Q 10/047 |
| WO | WO-2024224108 A2 * | 10/2024 | | G06Q 10/0631 |

OTHER PUBLICATIONS

TaskRabbit Review 2023: A Gig App to Get Work Done, Penny Hoarder (Jan. 19, 2023).

\* cited by examiner

600

WORK DISTRIBUTION PLATFORM WITH DYNAMIC ORDER-WORKER MATCHING SYSTEMS

BACKGROUND

In a distributed network environment, a platform computing system may face various challenges when managing tasks across client devices. One such challenge is pairing tasks with the appropriate client devices, particularly when tasks are heterogenous, and clients are heterogeneous. This challenge is exacerbated when the platform has incomplete information, when the platform is expected to adapt to real-time changes in information, and when the client devices have their own set of constraints.

With respect to incomplete information, the platform may not have all relevant information for a task or worker, and this information may be important for optimally pairing tasks and workers. Although machine learning models may infer some missing information, these models may be sub-optimal if there is insufficient or incomplete training data. Additionally, given the lack of complete information, the platform may be unable to determine which of a plurality of matching systems is optimal for a given set of data, and there may not, in some instances, be a single optimal matching system. With respect to real-time changes, the platform computing system may, in near real-time, need to receive data updates for tasks, clients, and contextual data, execute a program to respond to the updates, and propagate any necessary changes to client devices and other computing systems.

With respect to client device constraints, a client device may have limited processing power and memory, and it may have a display screen with a fixed size. Furthermore, workers associated with client devices may be unable or unwilling to provide certain data or expend significant time in assisting the platform computing system with matching tasks and client devices, thereby contributing to the challenge faced by the platform computing system of dynamically matching orders with workers.

SUMMARY

Aspects of the present disclosure relate to a work distribution platform that is coupled with client devices associated with workers. In some embodiments, the work distribution platform may include a plurality of dynamic matching systems that match orders with workers. An example matching system may be a worker offering system, with which the platform provides an order to client devices, and the client devices submit offers for the order. Additionally, the dynamic matching systems may, in some instances, respond to real-time changes in data, use machine learning models to infer information, and generate data to train machine learning models. Each of the plurality of matching systems may perform a distinct process for matching orders with workers, and two or more of the matching systems may be executed simultaneously and update the client devices in real-time.

In a first aspect, a work distribution platform is disclosed. The work distribution platform comprises a first matching system; a second matching system; a processor; and a memory storing instructions that, when executed by the processor, cause the work distribution platform to: receive a plurality of orders; provide, using the first matching system, a first order of the plurality of orders to a plurality of workers; receive, using the first matching system, a plurality of offers for the first order; select, using the first matching system, an offer from the plurality of offers for the first order; based on the selected offer, select, using the first matching system, a first worker of the plurality of worker; assign the order to the first worker; offer, using the second matching system, a second order of the plurality of orders to a second worker of the plurality of workers; receive, using the second matching system, an acceptance of the second order from the second worker; and assign the second order to the second worker.

In a second aspect, a platform for managing work is disclosed. The platform comprises a first matching system; a second matching system; a processor; and memory, the memory storing instructions that, when executed by the processor, cause the platform to: receive an order; determine a base price for the order; select the first matching system; provide, using the first matching system, the order to a plurality of workers; at an end of an offer acceptance window defined by the first matching system, determine whether any worker of the plurality of workers submitted an offer for the order; in response to receiving zero offers for the order, select the second matching system; offer, using the second matching system, the order at the base price to the plurality of workers; receive, using the second matching system, a claim of the order from a worker of the plurality of workers; and assign the order to the worker.

In a third aspect, a method for assigning work is disclosed. The method comprises selecting a first matching system of a plurality of matching systems; receiving a plurality of orders; selecting an order of the plurality of orders; setting a maximum offer price for the order based at least in part on an inference of a machine learning model trained using historical order characteristics and historical order prices; providing, using the first matching system, the order to a plurality of workers; receiving, using the first matching system, a plurality of offers for the order, each of the plurality of offers including an offer price; at an end of an offer acceptance window, selecting an offer of the plurality of offers based on the selected offer having a lowest offer price; assigning the order to a worker of the plurality of workers, wherein the worker submitted the selected offer; and updating the machine learning model using data from the order and from at least some offer prices of the plurality of offers.

DETAILED DESCRIPTION

Figure 1:
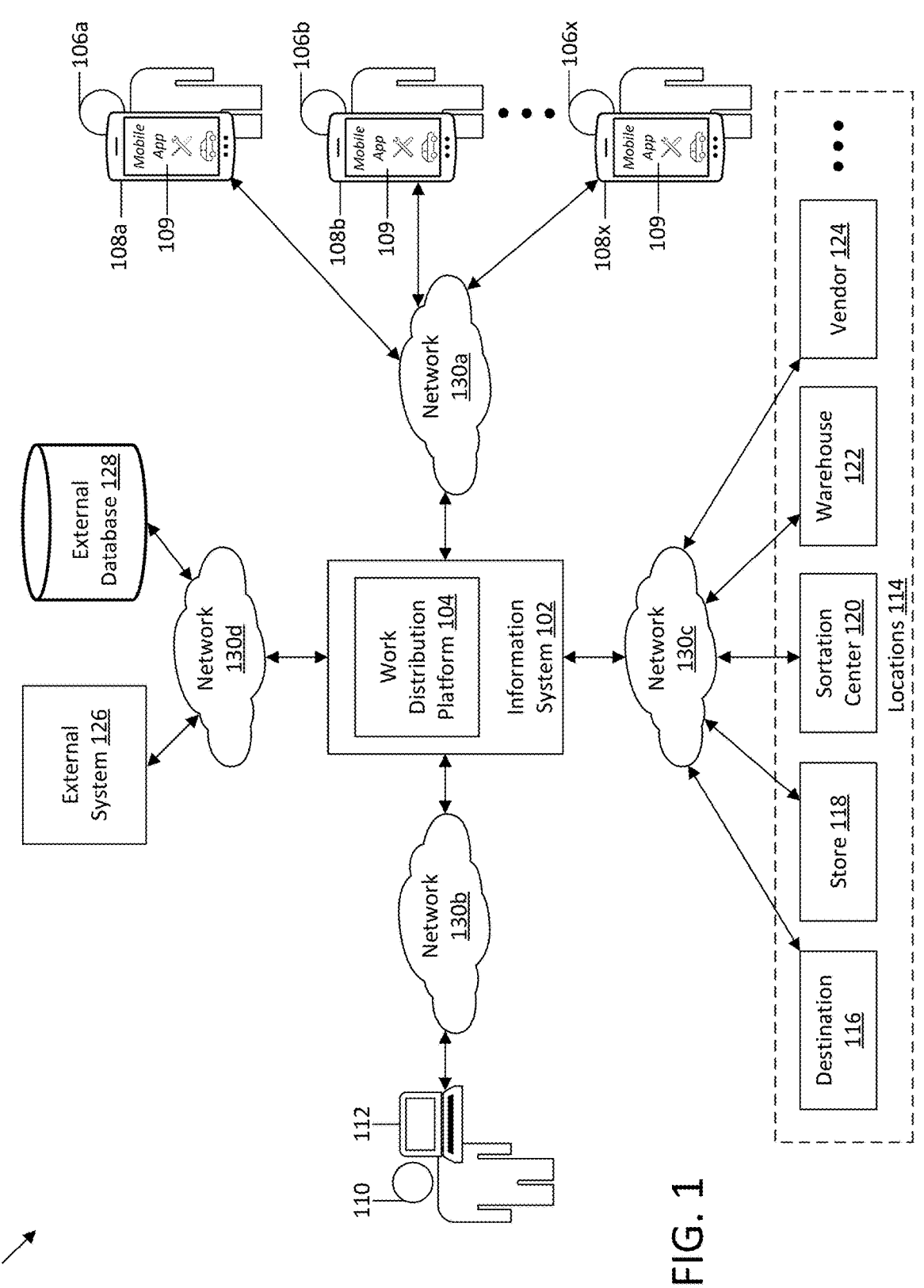
FIG. 1 illustrates a network environment in which aspects of the present disclosure may be implemented.

Aspects of the present disclosure relate to a work distribution platform that includes a plurality of matching systems. The matching systems may use a mobile application to provide an order to one or more client devices. With one example matching system, workers may submit an offer to perform the order. The matching system may then match the order to one of the workers that submitted an offer. In some examples, other matching systems may simultaneously be operating to match orders with workers by using the mobile application. In some embodiments, the matching systems may generate data that can be used to train machine learning models that are used to infer information that may not be readily available to the platform, but that may be important to optimally match orders with workers.

In example aspects, the platform may alter a process for matching an order as time passes. For example, a plurality of orders may be bundled, and a matching system may provide the bundle to a plurality of workers for the workers to make offers for the bundle. If none of the workers makes an offer, the matching system may separate the bundle into individual orders and provide the individual orders to a plurality of workers. If there are no offers on an individual order, then the platform may use a different matching system, such as matching system in which the individual orders are provided to workers at a model-determined prices and any of the workers may claim the orders. Alternatively, the platform may use a matching system that selects a particular worker (or a particular subset of workers) to whom an order is offered at a model-determined price, and the offered worker may accept or deny the order.

In example aspects, an order may have various restrictions that must be considered during matching. For example, a visibility of the order may be restricted to certain workers. The maximum price may be based in part on a model-determined price. For visibility, the order may not be visible to some workers, such as workers that dropped the order, workers that are unqualified to fulfill the order, or workers associated with certain metrics that are below a threshold. Additionally, the order may be visible to only a certain group, such as new workers, experienced workers, workers without a threshold number of already assigned orders, or another group of workers defined by a worker metric (e.g., experience with a certain store or customer, rating, drop ratio, engagement, timeliness, etc.).

Aspects of the present disclosure provide various technical advantages. For example, machine learning models used to infer missing information about orders or workers may be improved by the generation of diverse training data. The diverse training data may be generated by the different matching systems that may be used by the platform. Furthermore, the platform may operate the matching systems simultaneously along with a mobile application to communicate with client devices, and the mobile application may include a user interface that includes data from a plurality of matching systems, thereby ensuring an efficient data exchange between users of client devices and the platform. As a result, the platform may leverage the relative strengths of each matching system without being required to select one at the expense of another.

Yet still, given the heterogeneity of orders and workers, better-trained machine learning models and a multi-channel approach for matching may result in more optimal matches that reduce the number of dropped or incomplete orders, thereby reducing the processing power and network traffic required to rematch a dropped order and propagate any necessary data updates across a distributed network environment. Furthermore, in addition to improved matching outcomes, the platform may still, in near real-time, receive data changes (e.g., new or updated orders, updated worker information, contextual changes, such as weather, time, or traffic conditions), update an internal state based on the changes, and propagate any necessary data updates to client devices.

Yet still, aspects of the present disclosure may give workers more control over the price of an order, thereby giving workers more flexibility over their work and improving the worker experience. The worker experience may be further improved by providing workers with additional channels for selecting work. For example, a worker may, in some embodiments, claim an order in an open order system, accept an offer in a platform offering system, or submit an offer (with a worker-selected offer price) in a worker offering system.

Additionally, an entity associated with the platform may more accurately assess order values. For example, by receiving offers for orders in near real time, a selected price for an order may, in some instances, be a more accurate reflection of a value of an order than a model-determined price. Whereas a model-determined price may be based on historical data, prices submitted by workers for an available order may provide greater accuracy for a particular point in time in a market. As will be apparent, these are only some of the advantages provided by aspects of the present disclosure.

FIG. 1 illustrates an example network environment 100 in which aspects of the present disclosure can be implemented. The network environment 100 includes an information system 102 that includes a work distribution platform 104, a plurality of workers 106*a-x* having mobile devices 108*a-x*, a customer 110 having a device 112, a plurality of locations 114, an external system 126, an external database 128, and a plurality of networks 130*a-d*. In other examples, the network environment 100 can include more or fewer components than in the example of FIG. 1.

The information system 102 may be a collection of software, hardware, networks, data, and people. The information system 102 may be associated with an organization. For example, the organization may use, develop, maintain, own, or otherwise be associated with the components of the information system 102. In some embodiments, the information system 102 is associated with a retailer. The information system 102 may include one or more frontend systems via which the mobile devices 108-*x* or the device 112 may interact with the information system 102. The frontend systems may include one or more of a website or a mobile application 119 and may include user interfaces that are displayed on a browser or mobile application 119 running on the mobile devices 108*a-x* or the device 112. Some components of the information system 102 may operate in a common computing environment. Some components of the information system 102 may operate in different computing environments and communicate over a network, such as the internet. Some components of the information system 102 may be developed and maintained by a third-party (e.g., an entity different than the organization with which the information system 102 is associated). As shown, the information system 102 may include the work distribution platform 104.

The work distribution platform 104 may be a computing system that can manage work by receiving and processing orders, matching orders with workers, registering completion of work, receiving and transmitting performance data, and executing other functions. In some embodiments, the work distribution platform 104 may include a plurality of systems for matching workers with work. For example, the work distribution platform 104 may, in some embodiments, include the following systems: a platform offering system, with which the work distribution platform 104 offers an order to one or more workers based on order characteristics or worker characteristics; a worker offering system, with which the work distribution platform 104 receives offers from one or more workers for an order; and an open order system, in which an order is open to all eligible and available workers. The work distribution platform 104 may also include other systems, such as a system for storing worker data and order data, bundling orders, assigning orders to workers, tracking work completion, receiving new orders or order updates, or interfacing with frontend systems, such as a mobile application 119 or website. An example architecture of the work distribution platform 104 is illustrated below in FIG. 2.

The workers 106*a-x* may perform orders received via the work distribution platform 104. The workers 106*a-x* may be gig workers. Depending on the type of order received, the workers 106*a-x* may be shoppers, deliverers, drivers, service providers, or other types of workers. In some embodiments, each of the workers 106*a-x* may be associated with a mobile device that may communicate with the work distribution platform 104.

The mobile devices 108*a-x* may be phones, tablets, computers, or other computing devices. The mobile devices 108*a-x* may be client devices of the work distribution platform 104. Each of the mobile devices 108*a-x* may be associated with a worker (e.g., the worker may possess the mobile device or may have an account on the mobile device). In some examples, a mobile application 119 associated with the work distribution platform 104 may be installed on one or more of the mobile devices 108*a-x*. In some examples, a user of one of the mobile devices 108*a-x* may use an instance of the mobile application 119 running on the mobile device to communicate with the work distribution platform 104.

The customer 110 may submit an order to the work distribution platform 104. In some embodiments, the customer 110 is a person; in others, the customer 110 may be computer program (e.g., a software program that automatically creates and submits an order on behalf of a customer). To submit an order, the customer 110 may use the computing device 112, which may be a computer, mobile phone, smart device, or another computing device. In some embodiments, the customer 110 may use a mobile application 119 or a website associated with the work distribution platform 104 to submit an order. In some embodiments, the customer 110 may use a website or mobile application 119 associated with an entity from which the customer 110 is ordering a good or service (e.g., a store or restaurant).

The locations 114 may include locations associated with aspects of one or more of an order or a worker. In some embodiments, the locations 114 may be associated with computing systems that are communicatively coupled with the information system 102 for sharing data (e.g., data related to inventory, order fulfillment, delivery schedules, etc.). One or more of the locations 114 may be part of a supply chain that is associated with the information system 102. Each of the locations 114 may include a plurality of locations of that type. For example, the locations 114 may include a plurality of destinations, a plurality of stores, a plurality of sortation centers, a plurality of warehouses, a plurality of vendors, and a plurality of other locations. Additionally, there may be other types of locations than those illustrated by the locations 114, such as restaurants, venues, or other locations.

The destination 116 may be a destination location for an order. In some embodiments, to fulfill an order, one of the workers 106*-x* that is matched with the order may physically go to the destination 116 to perform the order. For example, the destination 116 may be a residence, office, or transportation location associated with the customer 110.

The store 118 may be a retail store. As an example, the customer 110 may order goods from the store 118 to the destination 116, and a matched worker of the workers 106*a-x* may deliver the goods from the store 118 to the destination 116. The store 118 may also be a restaurant or a pickup location.

The sortation center 120 may be a node in a supply chain. In some embodiments, the sortation center 120 may receive and consolidate items from a plurality of locations, such as stores. In some embodiments, an order may include transporting items from stores (or other locations) to the sortation center 120. In some embodiments, an order may include transporting items from the sortation center 120 to other locations, such as one or more destinations, as part of a last-mile delivery.

The warehouse 122 may receive, store, and ship items. In some embodiments, an order may include transporting items to or from the warehouse 122. The vendor 124 may be a third-party location that provides items (e.g., a warehouse, factory, or shipment service of a business partner). In some embodiments, an order may include transporting items to or from the vendor 124.

The external system 126 may be a third-party system that is communicatively coupled with the information system 102. For example, the third-party system 126 may provide software as a service that is used by the information system 102. In some embodiments, the external system 126 may provide services related to the workers 106*a-x*, the mobile devices 108*a-x*, customers, the locations 114, or other aspects of the present disclosure. The external database 128 may be a third-party data store that may be used by the information system 102 to store data related to aspects of the present disclosure.

The networks 130*a-d* may communicatively couple components of the network environment 100. Each of the network 130*a-d* can be, for example, a wireless network, a wired network, a virtual network, the internet, or another type of network. In some embodiments, two or more of the networks 130*a-d* may be the same network. Furthermore, one or more of the networks 130*a-d* may be divided into subnetworks, and the subnetworks can be different types of networks or the same type of network.

Figure 2:
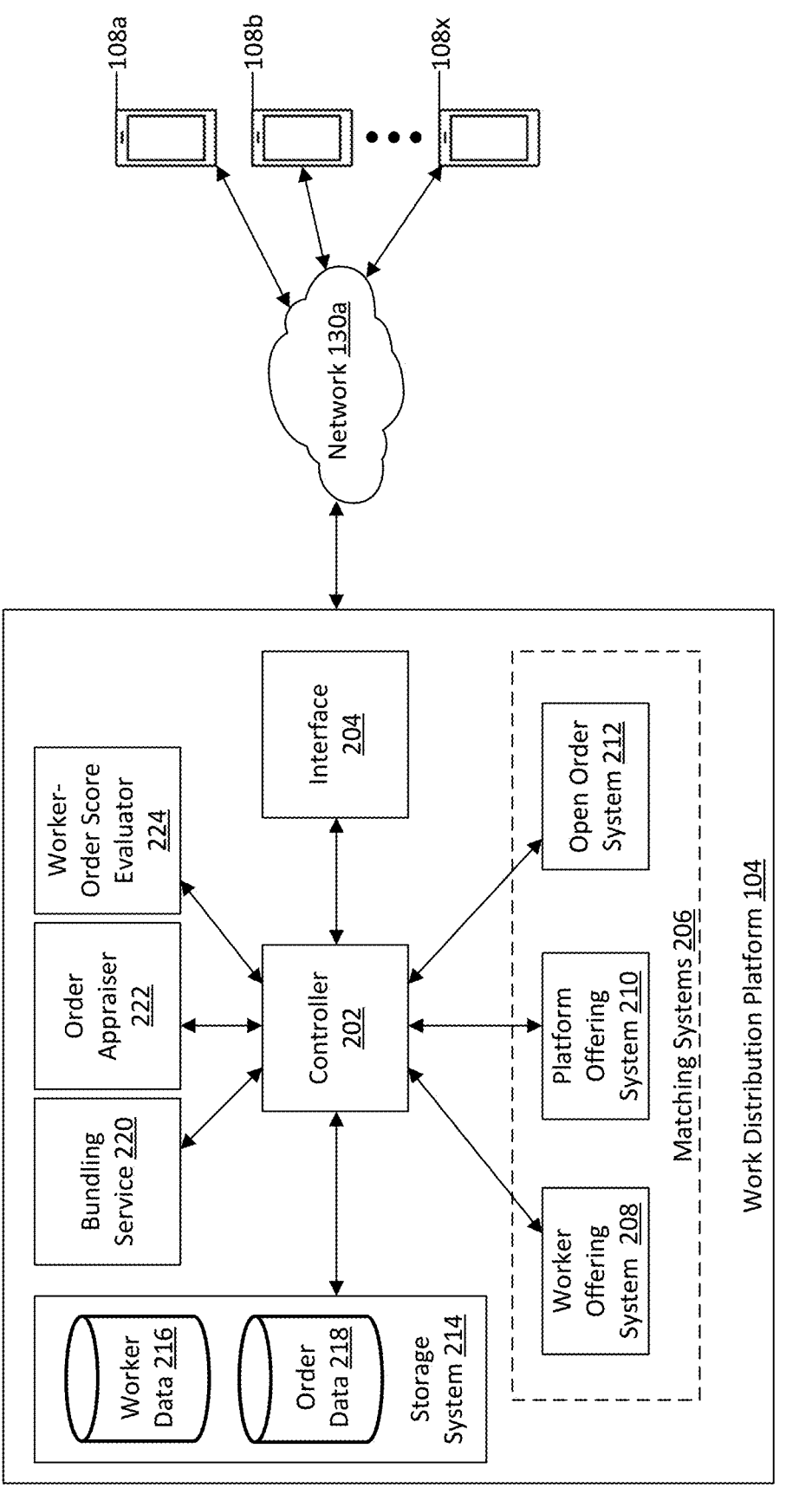
FIG. 2 illustrates a block diagram of an example architecture of a work distribution platform.

FIG. 2 illustrates a block diagram of an example architecture of the work distribution platform 104. As shown, the work distribution platform 104 may be communicatively coupled with the mobile devices 108*a-x*. In the example shown, the work distribution platform 104 has a plurality of components, including a controller 202, interface 204, matching systems 206, storage system 214, bundling service 220, order appraiser 222, and worker-order score evaluator 224. Each component of the work distribution platform 104 may include software, hardware, or a combination of software and hardware. In some embodiments, one or more components of the work distribution platform 104 may be cloud based. The work distribution platform 104 may include more or fewer components that those illustrated in the example of FIG. 2. Components of the work distribution platform 104 are described as having certain characteristics and performing certain functions. However, depending on the embodiment, the characteristics and functionality of components of the work distribution platform 104 may vary and overlap.

The controller 202 may process and respond to requests received from other systems. To do so, the controller 202 may coordinate operations performed by other components of the work distribution platform 104. For example, the controller 202 may store or update data in the storage system 214. As other examples, the controller 202 may retrieve data from the storage system 214, provide data to one or more other components of the work distribution platform 104, or generate a response to a request. In the example shown, the example shown, the controller 202 is communicatively coupled with each other component of the work distribution platform 104. In some embodiments, the controller 202 may be used to perform operations described herein as being performed by the work distribution platform 104.

The interface 204 may be communicatively coupled with frontend components of the work distribution platform 104, such as a mobile application or website associated with the work distribution platform 104. In some embodiments, the interface 204 may include one or more Application Programming Interfaces (APIs) that may be called by the mobile application 119 or a website to retrieve data, store data, or perform an operation. In some embodiments, the interface 204 may receive a request and provide the request to the controller 202 to generate a response. Furthermore, the interface 204 may receive a response from the controller 202 and provide it to a mobile device that called an API of the work distribution platform 104. In some embodiments, the interface 204 may display and receive data via the user interfaces illustrated and described below in connection with the FIGS. 7-8.

The matching systems 206 may include a plurality of systems for matching orders with workers. For example, when a customer submits an order, the order must be matched with a worker of a plurality of workers to perform the order. There may be a plurality of systems for matching orders with workers. In some embodiments, the work distribution platform 104 may use two or more of the matching systems simultaneously. In some instances, the work distribution platform 104 may use one matching system instead of another. In some instances, the work distribution platform 104 may use a combination of matching systems. In some embodiments, the work distribution platform 104 may use one matching system for a first set of workers and a different matching system for a second set of workers. In some embodiments, the work distribution platform 104 may use a one matching system during a first time period and a different matching system during a second time period.

Once an order and worker have been matched, the work distribution platform 104 may assign the order to the worker, and the worker may then perform the order according to a time specified by the order. Depending on which matching system is used, the process of matching an order and worker may vary. For instance, depending on the matching system, workers may make offers for an order, the platform may offer orders to workers, or workers may simply claim orders.

In some embodiments, one or more of the matching systems 206 may include a display in a mobile application 119 or website (e.g., a region for selecting or viewing orders provided using a particular matching system). In the example shown, the work distribution platform 104 includes a worker offering system 208, a platform offering system 210, and an open order system 212. In other embodiments, the work distribution platform 104 may include more or fewer matching systems.

The worker offering system 208 may be a matching system in which workers make offers for orders. For example, for a given order, the worker offering system 208 may facilitate the following operations: the worker offering system 208 may provide an order to a plurality of workers so that the workers may make offers to perform the order; the workers may make offers for the order; the worker offering system 208 may select an offer from among the offers; and the worker offering system 208 may assign the order to the worker associated with the selected offer.

In some embodiments, the worker offering system 208 may facilitate a process for matching orders with workers that passes through different stages as time passes. For example, the worker offering system 208 may receive an order that has a scheduled completion time (or a start of a completion time window) that is at 12:00 PM. At a time before 12:00 PM, the worker offering system 208 may provide the order to a plurality of workers during an offer acceptance window, which may be a fixed amount of time that the workers may submit offers for the order. For example, depending on a configurable setting, the worker offering system 208 may provide the order to the workers 2 hours, 1 hour, 30 minutes, or another amount of time prior to a completion time. Additionally, depending on a configuration of the worker offering system 208, the offer acceptance window may be 1 hour, 30 minutes, 15 minutes, or another amount of time.

In some embodiments, the worker offering system 208 may, as part of providing an order to workers so that the workers may make offers, set restrictions for worker offers. For example, the worker offering system 208 may set a maximum price that the workers may submit for an offer, and the worker offering system 208 may set a minimum price that the workers may submit for an order. Additionally, in some embodiments, the worker offering system 208 may set restriction on when workers may submit offers, such as only during the offer acceptance window or only when it is detected that a worker is not driving.

To set a maximum price, the worker offering system 208 may, in some embodiments, determine a base price for the order. The base price may be the price set by the order appraiser 222, which is described below. The base price may be the price of the order if it were offered to workers using the platform offering system 210. In some embodiments, the maximum price is the base price; however, in some embodiments, the maximum price may be the base price plus an increase amount. The increase amount may be, for example, an incentive amount that is applied to orders that are at risk of being late. In other embodiments, however, the increase amount may be determined differently, such as by increasing the base price by a percentage (e.g., 10%, 20%, or 50%) or by a fixed amount, such as $5. In some embodiments, the worker offering system 208 may dynamically adjust the maximum price based on updates to the order, a number of offers received for the order, a number of workers available to submit offers for the order, a quantity and characteristics of other orders, updated data regarding previously orders, or other data.

To set a minimum price, the worker offering system 208 may, depending on the embodiment, use one of a plurality of possible techniques. In some embodiments, the worker offering system 208 may determine an estimated time to complete the order (e.g., in hours) and multiply that time by a minimum hourly earnings (e.g., based on a law or based on an advertised minimum earnings) of the location in which the order is performed. In some embodiments, the worker offering system 208 may use the base pay (e.g., as determined by the order appraiser 222) to set the minimum earnings. For example, the minimum price may be the base pay, a percentage of the base pay, or the base pay minus an amount. In some embodiments, the worker offering system 208 may set the minimum price at zero. In some embodiments, the worker offering system 208 may set the minimum price at a different number and may dynamically alter the minimum price based on updated data or changing conditions, such as a number of received offers, a number of available workers, or data from previous orders.

In some embodiments, the worker offering system 208 may only be used for a subset of orders. For example, the worker offering system 208 may be used only for orders that have a built-in latency time (i.e., orders that are received by the work distribution platform 104 at least a threshold amount of time prior to when they must be completed or must be assigned). In some embodiments, the built-in latency time may allow the worker offering system 208 to take at least the amount of time of an offer acceptance window to receive offers for the order prior to receiving it. In some embodiments, the built-in latency time must be at least 15 minutes, 30 minutes, or one hour, depending on settings of the worker offering system 208.

In some embodiments, the worker offering system 208 may provide an order to only a subset of workers who may submit offers. In some embodiments, the worker offering system 208 may only provide the order to workers who are available, to workers who may be workers that are scheduled to work during a time of the order, to workers who selected an option via the mobile application 119 indicating that they are available or online, or to workers who are currently using the mobile application 119. In some embodiments, the worker offering system 208 may only provide an order to workers who are eligible to work it. For example, an order may have eligibility requirements, such as requiring that a worker be over a certain age (e.g., to deliver alcohol or pharmaceuticals), that a worker have certain equipment (e.g., a certain type of vehicle, such as a truck), that the worker has not previously dropped the order, that the worker is eligible to work with the customer, or other eligibility requirements. In some embodiments, the worker offering system 208 may provide an order to a subset of workers that is defined based on a different worker characteristic (e.g., experience, historical performance metric, region, etc.).

In some embodiments, the worker offering system 208 may selectively provide orders to workers for submitting an offer based on a worker metric. In some embodiments, the worker offering system 208 may use scores generated by the worker-order score evaluator 224 to select workers. In some embodiments, the worker offering system 208 may dynamically provide the order to more workers as time passes. For example, at the start of a time that offers are accepted, the worker offering system 208 may only provide an order to a certain 20% of available workers; however, at a later time, the worker offering system 208 may provide the order to more workers (e.g., to possibly receive more offers for the order). Advantageously, by selectively providing an order to some workers but not others (e.g., based on availability, eligibility, historical worker performance data, or other data), the work distribution platform 104 may use the worker offering system 208 to allow workers to set a price for the work while also retaining some control over which workers are able to submit offers for an order, thereby improving the worker experience while also ensuring that work is assigned to workers who are well suited to perform it.

In some embodiments, the worker offering system 208 may configure other aspects of an order that is provided to workers to make offers. For example, the worker offering system 208 may configure a setting related to whether workers are allowed to update an offer for an order. In some instances, workers may not be allowed to update an order. In some instances, workers may be allowed to edit an order, but only a fixed number of times (e.g., once) or only in a certain direction (e.g., only allowed to lower an offered price). In some instances, there are no limits for workers' ability to edit order. As another example, the worker offering system 208 may configure whether workers' offers for the order are visible to other workers. In some embodiments, aspects of other workers' offers are visible. For example, workers may view one or more of a current best offer (e.g., a current lowest price), a current number of offers for an order, or whether there exists a current offer. In some embodiments, workers' offers are hidden, such that a worker cannot see whether other workers have made an offer for the order. Other configurations of orders and offers are also possible.

In some embodiments, the worker offering system 208 may bundle an order with one or more other orders and provide the bundle to workers so that the workers may submit offers to perform the bundle. In some embodiments, the worker offering system 208 may use the bundling service 220, which is described below. In some embodiments, features described herein as being performed for an order may also be performed for a bundle (e.g., setting a maximum or minimum price, selecting a subset of workers to provide the bundle to, and configuring other options). In some embodiments, the worker offering system 208 may first provide a bundle and then, if no workers make an offer for the bundle, the worker offering system 208 may unbundle the bundle and provide the constituent orders to workers to make offers. For instance, the worker offering system 208 may receive an order at 9:00 AM that has a completion time at 12:00 PM. At 10:30 AM, the worker offering system 208 may bundle the order with one or more other orders and provide the bundle to workers during an offer acceptance window from 10:30 AM to 11:00 AM for workers to make offers to perform the bundle. If, at 11:00 AM, the worker offering system 208 has not received an offer for the bundle (or has not received an adequate offer), the worker offering system 208 may unbundle the orders and, during an offer acceptance window from 11:00 AM to 11:30 AM, provide the orders to workers so that workers may submit offers for the individual orders.

In some embodiments, the worker offering system 208 may analyze offers received from workers. In some embodiments, the worker offering system 208 may analyze offers at the end of an offer acceptance window, once a time for submitting offers for the provided order is finished (e.g., if an order is open for offers from 11:00 AM to 11:30 AM, then at 11:30 AM). In some embodiments, the worker offering system 208 may analyze offers as they are submitted. Each of the offers may include an offer price input by the worker that submitted the offer. The price may correspond to an amount of money that the worker will be paid if the worker's offer is selected and if the worker fulfills the order. In some embodiments, an offer may include other data as well. For example, an offer may include a reduction or de-escalation option that includes an amount to which the worker is willing to reduce his or her offer to receive the order. For instance, a first worker may submit an offer with a price of $30 and include a de-escalation option down to $25. If an offer from a second worker has a price of $28, the de-escalation option make activate, and the first worker's price may be automatically lowered to $27, or to another amount lower than $28 and equal to or above $25. An offer may also include data about the worker who submitted the offer, such as whether the worker has other pending offers or assigned orders. Furthermore, the offer may include historical worker performance data or other metrics for the worker (or may include an identifier of the worker so that such data may be retrieved from the storage system 214).

In some embodiments, the worker offering system 208 may select an offer from among one or more offers received for an order. In some embodiments, the worker offering system 208 may select the order having the lowest offer price. To break ties, the worker offering system 208 may randomly select among the offers having the lowest price, or the worker offering system 208 may consider other data, such as a number of orders currently assigned to a worker, a number of pending offers submitted by the worker, or historical worker performance data.

In some embodiment, the worker offering system 208 may select an offer from among a plurality of offers by considering factors other than price. For example, even if a worker submitted an offer having the lowest price, the worker offering system 208 may not, in some embodiments, select that offer if doing so would cause the worker to have too many assigned order (e.g., a maximum number of assigned orders may be set by the work distribution platform 104, such as 2 or 3 orders for a given completion time frame). In some embodiments, the worker offering system 208 may run an optimization algorithm across a plurality of offered orders so that work is distributed. For example, if a first worker submits an offer with a price of $10 and $12 for a first and second order, respectively, and if a second worker submits an offer with a price of $11 and $13 for the first and second order, respectively, then the worker offering system 208 may, in some embodiments, assign the first order to the first worker and the second order to the second worker, even though the first worker submitted a lower price for each of the first and second order. In some embodiments, the worker offering system 208 may select an offer using a different approach or a combination of techniques.

The platform offering system 210 may be a matching system in which the platform offers orders to workers. For example, for a given order, the platform offering system 210 may select a worker from a plurality of workers, offer the order to the selected worker, and receive an acceptance of the offered order from the selected worker. To select a worker, the platform offering system 210 may apply one or more machine learning algorithms that evaluate, based at least in part on historical worker performance data and order characteristics, whether a worker is likely to accept an order if offered and whether a worker is likely to complete the order if assigned. In examples, the platform offering system 210 may use the worker-order score evaluator 224. In some embodiments, the platform offering system 210 may offer the order at a base price, which may, in some embodiments, be determined by the order appraiser 222. In some embodiments, the platform offering system 210 may offer an order to two or more workers. In some embodiments, the platform offering system 210 may use the bundling service 220 to offer a bundle to a worker. Aspects of the platform offering system 210 are described in U.S. application Ser. No. 18/149,577, entitled "WORK MANAGEMENT PLATFORM," which is hereby incorporated by reference in its entirety.

The open order system 212 may be a matching system in which orders are made available for workers to claim. In some embodiments, the open order system 212 may make orders available to all eligible and available workers in a region of the order. Rather than making offers for orders, the workers may simply claim an order. In response to receiving a claim of an order, the open order system 212 may assign the claimed order to the claiming worker. In some embodiments, the open order system 212 may make available bundles of orders to claim. In some embodiments, the open order system 212 may use the order appraiser 222 to generate a base price that is assigned to orders made available by the open order system 212.

The storage system 214 may include one or more databases that store data received by the work distribution platform 104 or generated by the work distribution platform 104. The storage system 214 may also perform operations for retrieving, storing, or updating data. In the example shown, the storage system 214 includes worker data 216 and order data 218. The storage system 214 may store data in a common database or in separate databases. In some embodiments, the storage system 214 may update the databases in real time as actions are performed by the work distribution platform 104 and as requests are received by the work distribution platform 104.

The worker data 216 may include data related to the workers 106a-x and the mobile devices 108a-x. For example, the worker data 216 may include registration or biographical information for the workers 106a-x. As another example, the worker data 216 may include historical performance metrics for the workers 106a-x. As another example, the worker data 216 may include information for worker availability (e.g., when a worker is working or scheduled to work) and eligibility (e.g., worker information that enables or restricts a worker's ability to perform an order, such as age or vehicle type). As another example, the worker data 216 may include log data of worker activity in the mobile application 119. As another example, worker data 216 may include data related to orders. For example, the worker data 216 may include data for assignments of orders to workers, data for orders offered to workers, and data for offers made by workers for orders.

The order data 218 may include data related to orders. An order may be a task to be performed by one or more workers. Examples of orders include, but are not limited to, the following: a shopping order, a delivery of one or more items, a taxi service, a handyman or home improvement service, or another service. In some embodiments, an order may be an aggregate of multiple pieces of work (e.g., an aggregation of multiple deliveries). In some embodiments, two or more orders may be bundled. For an order, the order data 218 may include, for example, an order type, an estimated order completion time, a price, a number of items, a number of stops, one or more times, a customer, one or more locations (e.g., one or more origins or one or more destinations), and other data related to an order. The order data 218 may also include data for one or more workers associated with an order, such as an assigned worker, one or more workers to whom an order is offered, or one or more workers (and offers) who made an offer for an order.

The bundling service 220 may combine two or more orders to form a bundle of orders. Furthermore, the bundling service 220 may unbundle a bundle into its two or more constituent orders. In some embodiments, the bundling service 220 may receive a plurality of orders and generate one or more bundles from the plurality of orders. To do so, the bundling service 220 may analyze order characteristics. In some embodiments, the bundling service 220 may input order characteristics into a machine learning model to generate bundles.

In some embodiments, the bundling service 220 may bundle orders having similar characteristics, such as having a same origin location (e.g., being ordered from the same store), being in a similar region, having nearby destination locations, having the same eligibility requirements, or being similar in another manner. In some embodiments, the work distribution platform 104 may bundle orders having complementary characteristics. For example, if a first order has many items, it may be bundled with a second order having few items, thereby allowing a user to complete both orders within a same delivery window, for example. As another example, orders may be bundled based on sequential completion windows. If, for example, a first order is scheduled to be completed at 4:30 PM then it may be bundled with a second order scheduled to be completed at 5:00 PM. In some embodiments, the order may be bundled based on a combination of similar characteristics and complementary characteristics. Additionally, in some embodiments, bundling service 220 may account for contextual factors, such as a number of available workers or a quantity or characteristics of other orders.

The order appraiser 222 may receive an order and determine a price for the order. To do so, the order appraiser 222 may use a machine learning model. In some embodiments, the price may be used as a base price. The base price may be offered by the work distribution platform 104 to the workers 106a-x to perform the order. In some embodiments, the base price may be used to determine a maximum or a minimum price that may be offered by workers for an order, as described above in connection with the worker offering system 208. To determine a price, the order appraiser 222 may, in some embodiments, determine an estimated time to complete an order and then multiply the estimated time by a rate associated with a region (e.g., neighborhood, city, state) in which the order is to be performed.

To determine an estimated to complete an order, the order appraiser 222 may evaluate an order type, an order size (e.g., number of items), a travel distance, a travel time, a store, or other characteristics. In some embodiments, the order appraiser 222 may use an order appraiser machine learning model (e.g., a neural network) to determine an estimated order time, and the order appraiser 222 may input order characteristics and other contextual data related to an order (e.g., time of day, region, etc.) into the machine learning model to determine an estimated completion time. In some embodiments, a machine learning model of the order appraiser 222 is trained based at least in part on historical order characteristics and historical order prices.

To determine a rate associated with a region, the order appraiser 222 may, in some embodiments, determine a historical average rate for that region. In some embodiments, the order appraiser 222 may be configured by an administrator to apply a customized rate for each of a plurality of regions. In some embodiments, the rate may be a minimum rate, as determined by a legal minimum earnings or by an advertised minimum rate.

The worker-order score evaluator 224 may determine a numerical score for order-worker combinations. A higher score may indicate that the worker and order are a good fit; a lower score may indicate the worker and order are a bad fit. To generate such a score, the worker-order score evaluator 224 may use order characteristics and historical worker performance data. Additionally, the worker-order score evaluator 224 may use logistic regression, support-vector machines (SVMs), deep learning, neural networks, gradient boosting, decision trees, random forests, or other techniques related to regression or machine learning to generate a score based on order characteristics and past worker performance data. In some embodiments, the worker-order score evaluator 224 may determine a likelihood that, for a given order, a worker accepts the order if offered. In some embodiments, the worker-order score evaluator 224 may determine a likelihood that, for a given order, the worker completes an order if assigned to that order.

Figure 3:
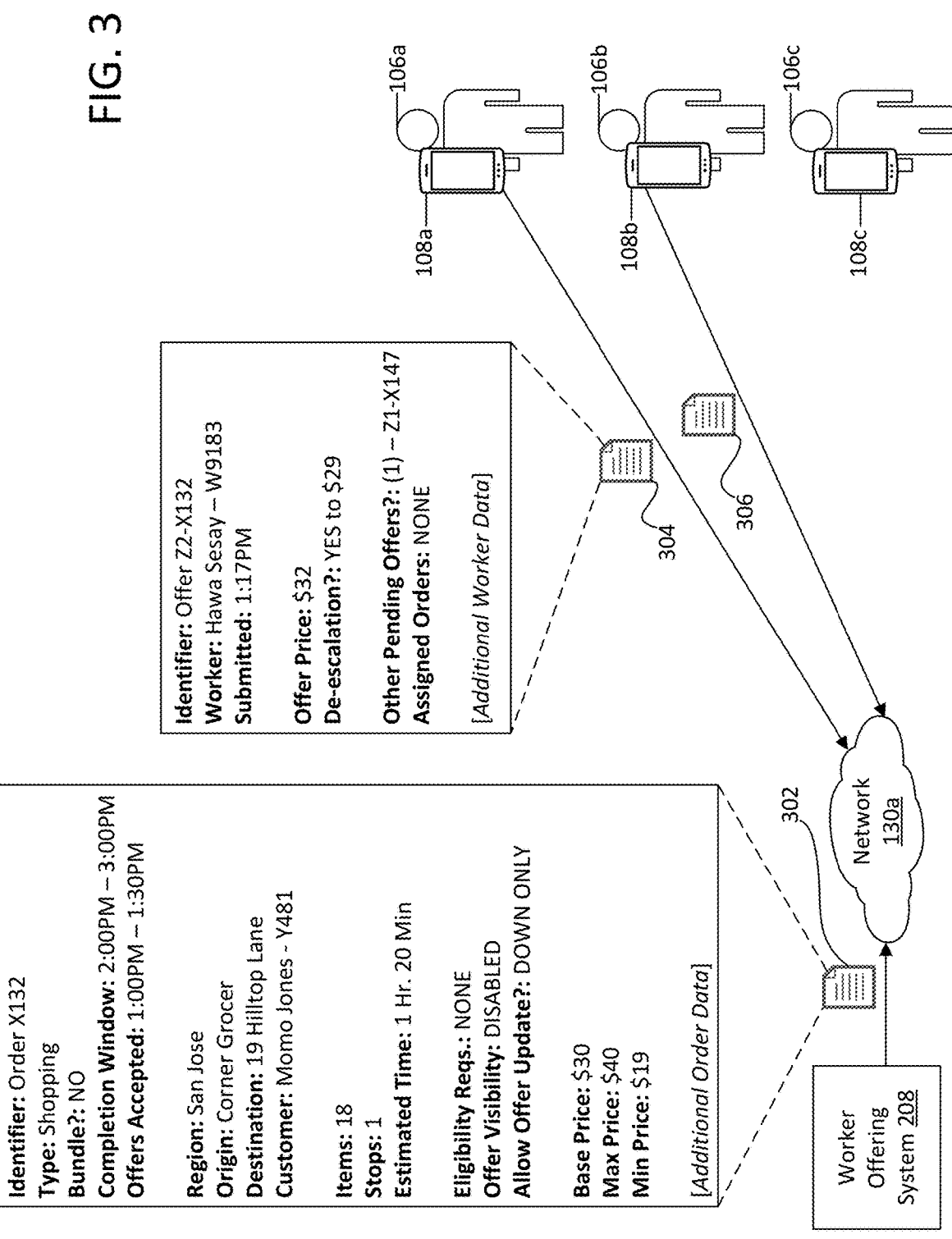
FIG. 3 illustrates a schematic diagram of an example data exchange between workers and a component of the work distribution platform.

FIG. 3 illustrates a schematic diagram of an order 302 and offers 304-306 to perform the order 302. Specifically, the example of FIG. 3 illustrates the worker offering system 208 providing the order 302 to the workers 106a-c so that the workers 106a-c may submit offers for the order 302. In the example shown, the workers 106a and 106b may use a mobile application 119 to view the order 302 and submit the offers 304 and 306, respectively. In the example shown, the worker 106c does not submit an offer for the order 302. For example, the worker 106c may not be interested in performing the order 302, or the worker offering system 208 may not have made the order 302 available to the worker 106c, because of historical performance data of the worker 106c, for example. FIG. 3 further illustrates example data associated with the order 302 and the offer 304. Although some of the data of the order 302 illustrated in FIG. 3 may be transmitted to one or more of the mobile devices 108a-c, some of the data shown may be for illustrative purposes and may be accessed by the worker offering system 208 without providing it to any of the mobile devices 108a-c. For example, only some of the data illustrated in connection with the order 302 may be visible to the workers 106a-c via a mobile application 119. Relatedly, not all data of the offer 304 illustrated in the example of FIG. 3 need be transmitted by the mobile device 108a to the worker offering system 208. For example, some of the information described in connection with the offer 304 may, in fact, be stored at the work distribution platform 104.

Continuing with the example of FIG. 3, the order 302 is associated with various data. In the example shown, such data incudes the following: an order identifier; an order type; whether the order is a bundle or an individual order; a completion window; an offer acceptance window; a region; an origin; a destination; a customer name and ID; a number of items; a number of stops; an estimated completion time; eligibility requirements; whether workers' offers for the order are visible to other workers; whether offer adjustments are allowed; a base price; a maximum price; a minimum price; and other order data.

In examples, the offer acceptance window may correspond with a time period that the worker offering system 208 provides the order 302 to workers so that the workers may submit offers for the order 302. In examples, the data corresponding to items may include not only a quantity of items but also data for individual items (e.g., a name, price, SKU, location, etcetera). In addition to the data shown, the order 302 may also include other data described above in connection with FIG. 2.

Continuing with the example of FIG. 3, the offer 304 is associated with various data. In the example shown, such data includes the following: an offer identifier, which may include the order identifier; a worker name and identifier; a time that the offer was submitted; an offer price; a de-escalation option and de-escalation price; data related to other pending offers submitted by the worker 106a; data related to other orders assigned to the worker 106a; and other data related to the worker 106a, the mobile device 108a, or orders associated with the worker 106a. Though not illustrated, the offer 306 may also be associated with various data, including an offer price submitted by the worker 106b for the order 302.

Figure 4:
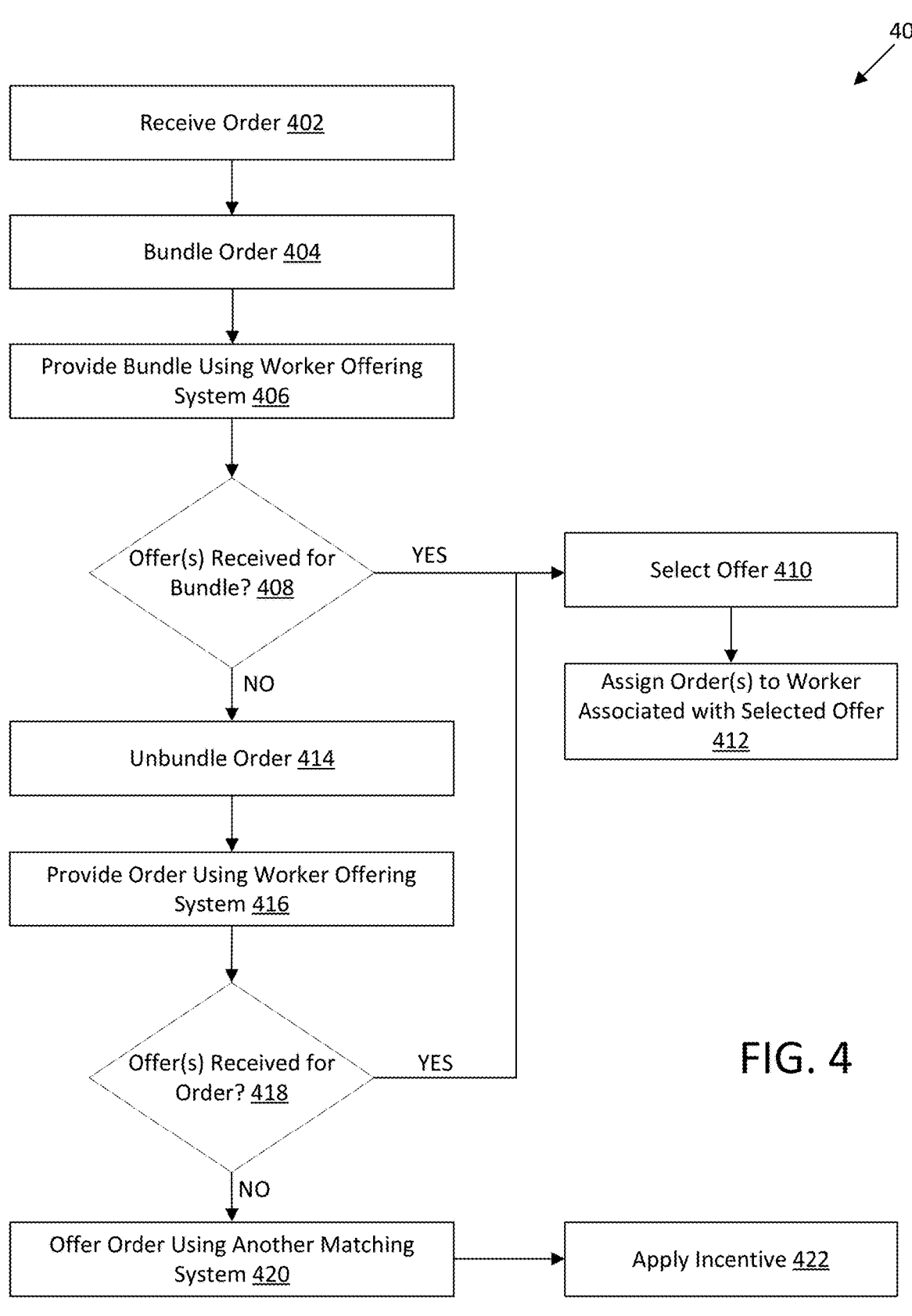
FIG. 4 is a flowchart of an example method for matching an order with a worker.

FIG. 4 is a flowchart of an example method 400 for matching an order with a worker. In the example of FIG. 4, the method 400 is described as being performed by the work distribution platform 104. However, aspects of the method 400 may be performed by other components described herein. Although described as being performed for a single order, aspects of the method 300 may be performed for a plurality of orders. In the example of FIG. 4, the work distribution platform 104 may use a plurality of matching systems of the matching systems 206 to match the order with a worker.

In the example shown, the work distribution platform 104 may receive an order or a plurality of orders (step 402). For example, the work distribution platform 104 may receive an order from the customer 110. In some embodiments, the work distribution platform 104 may access an order from the order data 218. In some embodiments, work distribution platform 104 may receive data corresponding to an order via one or more of a website or a mobile application 119. The data may include for example, an order type, one or more locations (e.g., an origin location and a destination location), one or more items, one or more times (e.g., a beginning of a completion time and an ending of a completion time), a customer identifier, or other data related to an order. In some embodiments, the work distribution platform 104 may standardize data of the order so that it may be used by downstream systems. In some instances, there may be a time delay after the work distribution platform 104 receives the order. For example, the order may be received a few days or hours prior to a time that the order is scheduled to be performed, in which case the work distribution platform 104 may not further process the order until a later time.

In the example shown, the work distribution platform 104 may bundle the order (step 404). For example, the work distribution platform 104 may use the bundling service 220 to combine the order with one or more other orders. Aspects of the bundling service 220 are described above in connection with FIG. 2.

In the example shown, the work distribution platform 104 may provide the bundle to a plurality of workers using the worker offering system 208 (step 406). Aspects of the worker offering system 208 are described above in connection with FIG. 2. For example, the work distribution platform 104 may, for a time period, provide the bundle to one or more workers so that the workers may submit offers for the bundle. In some embodiments, the work distribution platform 104 may configure aspects of the bundle, such as a maximum and minimum price.

In the example shown, the work distribution platform 104 may determine whether any offers were received for the bundle (step 408). In response to determining that an offer was received, the work distribution platform 104 may proceed to the step 410 (e.g., taking the "YES" branch). In response to determining that zero offers were received for the bundle, the work distribution platform 104 may proceed to the step 414 (e.g., taking the "NO" branch). Additionally, in some embodiments, the work distribution platform 104 may determine that, although one or more offers were received for the bundle (or offer in the context of the step

418), the one or more received offers are inadequate (e.g., that are received from workers who already have too many assigned orders, or that have too low of a price). Thus, receiving zero offers may, in some instances, correspond with receiving zero adequate offers, even if one or more offers were, in fact, received for the order. In such a case, the work distribution platform 104 may proceed to the step 414 (e.g., taking the "NO" branch). In response to receiving zero offers for an order (or for a bundle), the work distribution platform 104 may generate a training instance for a machine learning model (e.g., the order appraiser 222) that includes characteristics of the order and an indication of a failure to receive offers for the order.

In the example shown, the work distribution platform 104 may select an offer (step 410). In some embodiments, the work distribution platform 104 may use the worker offering system 208 to select an offer from a plurality of offers, as described above in connection with FIG. 2.

In the example shown, the work distribution platform 104 may assign the order (or bundle) to the worker that submitted the selected offer (step 412). In some embodiments, assigning the order to the worker may cause a display on the mobile application 119 used by the worker to update to indicate that the worker is assigned to the order. In some embodiments, once the order is assigned to the worker, it is the responsibility of the worker to either complete the order or drop the order. If the worker completes the order, then the work distribution platform 104 may update databases and models with data related to the worker and completed order. If the worker drops the order, then the work distribution platform 104 may match the order with a different worker. Depending on a time until the dropped order must be completed, the work distribution platform 104 may, in some embodiments, select a different one of the matching systems 206 to match the order with a worker.

In the example shown, returning to an example in which no orders were received for a bundle, the work distribution platform 104 may unbundle an order (step 414). For example, the work distribution platform 104 may use the bundling service 220 to unbundle the order from the one or more orders with which the order was bundled at the step 404.

In the example shown, the work distribution platform 104 may provide the order to a plurality of workers using the worker offering system 208 (step 416). Aspects of the worker offering system 208 are described above in connection with FIG. 2. For example, the work distribution platform 104 may, for a time period, provide the order to one or more workers so that the workers may submit offers for the order. In some embodiments, the work distribution platform 104 may configure aspects of the order, such as a maximum and minimum price.

In the example shown, the work distribution platform 104 may determine whether offers were received for the order (step 418). In response to determining that an offer was received, the work distribution platform 104 may proceed to the step 410 (e.g., taking the "YES" branch). In response to determining that no offers were received for the order, the work distribution platform 104 may proceed to the step 420 (e.g., taking the "NO" branch).

In the example shown, the work distribution platform 104 may, having not received offers for the order, offer the order using another matching system (step 420). For example, at the steps 406 and 416, the work distribution platform 104 may have used the worker offering system 208 to match the order (or bundle including the order) to match the order with a worker. At the step 420, the work distribution platform 104 may select, for example, one or more of the platform offering system 210 or the open order system 212 to match the order with a worker. Each of the platform offering system 210 and the open order system 212 are described above in connection with FIG. 2.

In the example, shown, the work distribution platform 104 may apply an incentive to the order (step 422). For example, if an order is at-risk of not being completed on time, the work distribution platform 104 may apply an incentive. In some embodiments, an order may be at-risk of not being completed on time if it is not yet matched with an order at a time prior to a completion time. For example, if an order has a completion window start of 6:00 PM, and the order is not matched by, for example, 5:30 PM (or another config-urable time prior to the completion window start time), then the order may be at-risk of not being completed on time. The incentive may be an increase to an offered price. In some embodiments, the price increase may be determined based on an algorithm, and the amount of the incentive may increase as time progresses. If, however, the order was accepted or claimed using the platform offering system 210 or the open order system 212 prior to an at-risk time, then the work distribution platform 104 may not apply the incentive.

Figure 5:
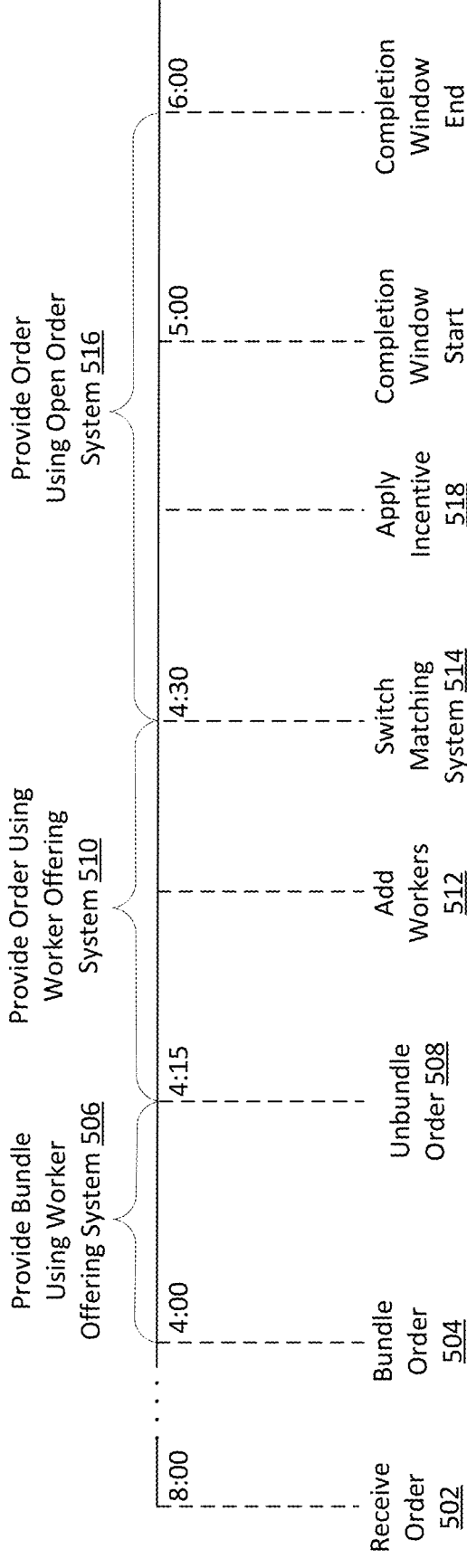
FIG. 5 illustrates a schematic diagram of an example timeline of an order.

FIG. 5 illustrates an example timeline 500 of operations performed by the work distribution platform 104 for an order. Although operations in the timeline 500 are described as being performed by the work distribution platform 104, one or more of the illustrated operations may be performed by other components described herein. Furthermore, although described as being performed for a single order, operations of the timeline 500 may be performed for a plurality of orders, and the operations of the timeline 500 may be performed simultaneously across the plurality of orders. Furthermore, the times shown are examples. Depending on the embodiment, order characteristics, worker data, or other data, the relative timing of the operations illustrated in the example of FIG. 5 may vary. Furthermore, the sequence of operations illustrated may be altered (e.g., adding workers may be performed after switching matching systems, applying an incentive may occur before unbundling an order, etc.). Furthermore, the work distribution platform 104 may perform more or fewer operations than those illustrated.

In the example shown, the work distribution platform 104 may receive an order at 8:00 AM (step 502). The order may have a completion time frame from 5:00 PM to 6:00 PM. In the example shown, the work distribution platform 104 may hold (e.g., not bundle the order or try to match the order with a worker) until 4:00 PM.

In the example shown, the work distribution platform 104 may bundle the order at 4:00 PM (step 504). The work distribution platform 104 may provide the bundle to a plurality of workers using the worker offering system 208 during an offer acceptance window from 4:00 PM to 4:15 PM (step 506). At 4:15 PM, if the work distribution platform 104 did not receive any offers for the bundle, the work distribution platform may unbundle the order (step 508).

In the example shown, the work distribution platform 104 may provide, to a plurality of workers, the individual order using the worker offering system 208 during an offer accep-tance window from 4:15 PM to 4:30 PM (step 510). In some embodiments, the work distribution platform 104 may add workers to the plurality of workers that can make an offer to perform the order (step 512). For example, in response to determining that no workers of a plurality of workers submitted an offer for the order, the work distribution platform 104 may add more workers that have visibility to the order and that can make an offer for the order.

In the example shown, the work distribution platform 104 may switch to a different matching system at 4:30 PM (step 514). For example, the work distribution platform 104 may switch to the open order system 212 after not receiving any offers for the order from 4:15 PM to 4:30 PM. From 4:30 PM to 6:00 PM, the work distribution platform 104 may provide the order to workers using the open order system 212. At some time prior to the completion window start time, the order may become at risk of being late if it is not claimed by a worker. At such a time, the work distribution platform 104 may apply an incentive to the order (step 518). In some embodiments, the work distribution platform 104 may apply the incentive at 4:30 PM (e.g., at the same time as switching to the open order system 212 and providing the order to the workers via the open order system 212). At 5:00 PM, the completion window may begin, and at 6:00 PM, the comple-tion window end. If a worker is assigned to a worker, then it may be the responsibility of the worker to complete the order between 5:00 PM and 6:00 PM. The order may be late if completed after 6:00 PM.

Figure 6:
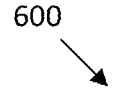
FIG. 6 is a flowchart of an example method for matching an order with a worker.
Figure 6:
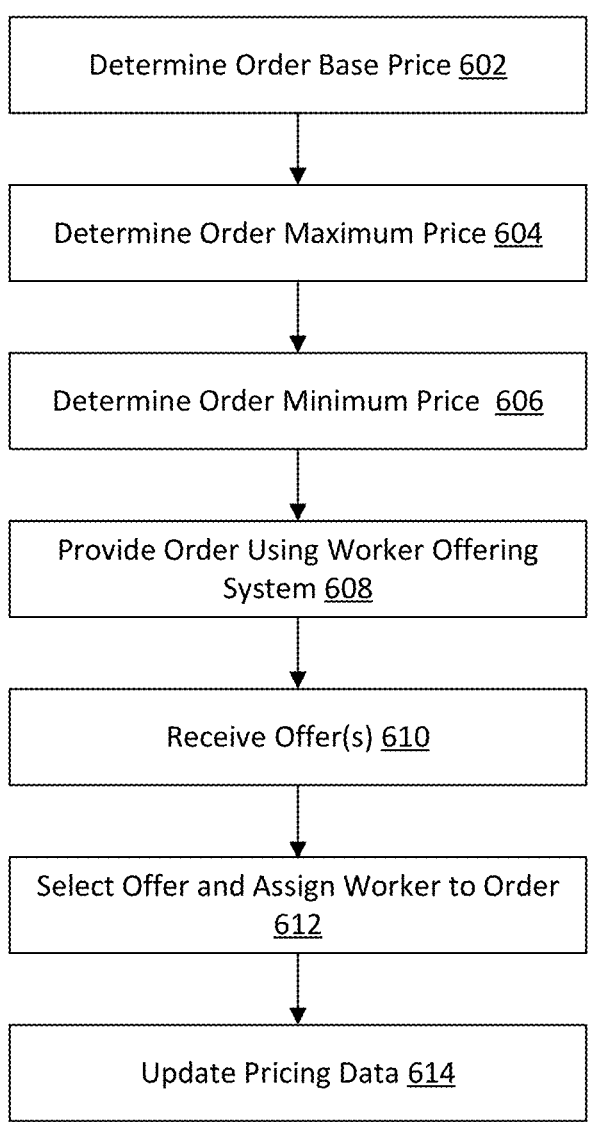

FIG. 6 is a flowchart of an example method 600. In some embodiments, operations of the method 600 may be per-formed by the work distribution platform 104 or components of the work distribution platform 104. For example, opera-tions of the method 600 may be performed by the worker offering system 208 of FIG. 2 as part of matching orders with workers.

In the example shown, the work distribution platform 104 may determine a base price for an order (step 602). For example, the work distribution platform 104 may use the order appraiser 222 of FIG. 2 to determine a base price for the order.

In the example shown, the work distribution platform 104 may determine a maximum price for the order (step 604) and a minimum price for the order (step 606). Examples of determining a maximum and a minimum price for an order are described above in connection with the worker offering system 208 of FIG. 2.

In the example shown, the work distribution platform 104 may provide the order to a plurality of workers using the worker offering system 208 (step 608), the work distribution platform 104 may receive one or more offers for the pro-vided order (step 610), and the work distribution platform 104 may select an offer from among the one or more offers and assign the order to the worker associated with the selected offer (step 612). Each of the steps 608-612 are further described above in connection with, for example, the FIGS. 2-5.

In the example shown, the work distribution platform 104 may update pricing data (step 614). For example, the work distribution platform 104 may update one or more databases or models based on the order provided by the worker offering system and the offers received. For instance, prices that were offered for the order may be tracked and stored in a database used by the order appraiser 222 or may be used to update models used by the order appraiser 222. Thus, the order appraiser 222 may be trained on data that represents values that workers think orders with certain characteristics are worth, and such data may increase the accuracy of the order appraiser 222 when setting base prices for future orders. Additionally, such data may be used for determining maximum or minimum prices for future orders. For instance, if no offers were received for an order, then that instance will may be tracked and used to update databases and models, so that for a future order having the same or similar characteristics, a base price or maximum price for the future order may be increased. In some embodiments, order and offer data from the worker offering system 208 may be logged, and models of the work distribution platform 104 may be updated in batches using the logged order and offer data. In some embodiments, data from the platform offering system 210 and open order system 212 may also be used to update models (e.g., indications of whether an order was offered and accepted, whether an incentive was applied, whether an order was dropped, etc.).

Figure 7:
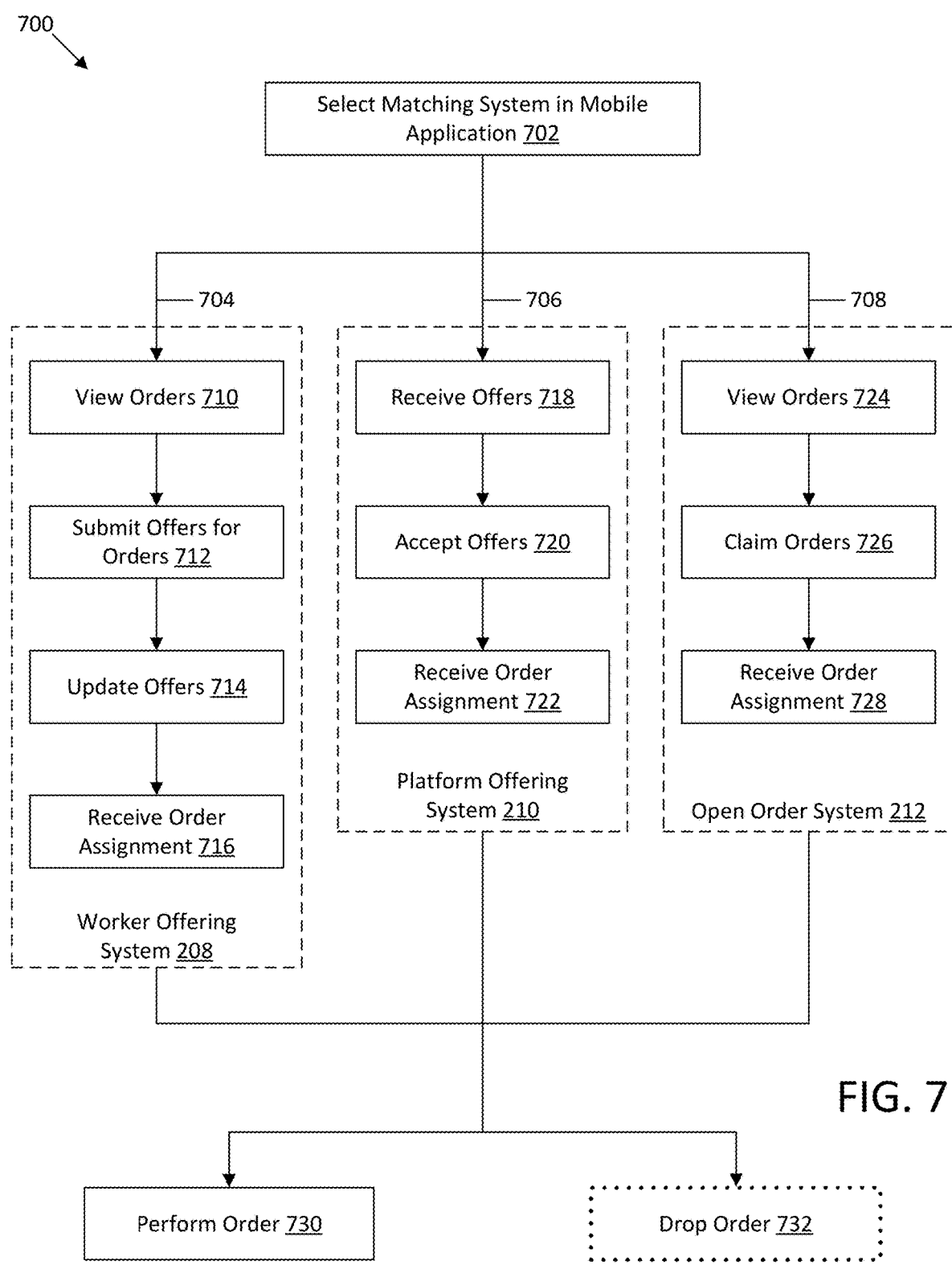
FIG. 7 is a flowchart of an example method that may be performed by a worker.

FIG. 7 is a flowchart of an example method 700 that may be performed by a worker, such as a worker of the plurality of workers 106*a-x*. In some embodiments, the worker may use a mobile application 119 associated with the work distribution platform 104 to perform aspects of the method 700.

In the example shown, the worker may select a matching system presented by the mobile application 119 (step 702). For example, the mobile application 119 may, in some embodiments, include different matching systems that may be selected by a worker to match with work. In some embodiments, the matching systems of the mobile application 119 are part of the matching systems 206 of FIG. 2. In some embodiments, the mobile application 119 may include a user interface or a display region of a user interface for each of the matching systems. If the worker selects a matching system corresponding to the worker offering system 208 (e.g., following the path 704), the worker may proceed to the step 710. If the worker selects a matching system corresponding to the platform offering system 210 (e.g., following the path 706), the worker may proceed to the step 718. If the worker selects a matching system corresponding with the open order system 212 (e.g., following the path 708), the worker may proceed to the step 724.

In the example shown, the steps 710-716 may be facilitated by the worker offering system 208, which is described above in connection with FIG. 2.

In the example shown, the worker may view orders for which the worker may submit an offer (step 710). In some embodiments, there may be a plurality of such orders available. In examples, the orders may include at least some of the information displayed in connection with the example order 302 of FIG. 3. In some embodiments, a batch of orders may be visible. For example, for orders of the batch of orders, the orders may have a common offer acceptance window (e.g., between 4:00 PM and 4:30 PM), or the orders may have a common completion time.

In the example shown, the worker may submit an offer for one or more offers (step 712). The worker may customize each offer. For example, the worker may submit a different offer price and other data for each of the orders for which the worker submits an offer.

In the example shown, the worker may update offers (step 714). For example, the worker may update an offer price for one or more of the orders submitted at the step 712. In some instances, however, the worker offering system 208 may not allow the worker to update one or more of the orders.

In the example shown, the worker may receive one or more order assignments (step 716). When a worker receives an order assignment, the order may become the worker's responsibility to perform. In some embodiments, the worker may be able to see more information about the order once it has been assigned (e.g., customer contact information, item details, or other information). In some embodiments, data for an assigned order may be displayed in a different user interface or a different region of the mobile application 119. Such changes for an assigned order may apply regardless of the matching system with which the worker and order were matched. At the step 716, the worker may be assigned by the work distribution platform 104 to the orders for which the worker submitted an offer with the lowest price. However, the worker may be limited to a certain number of assigned orders at a time.

Returning to the case in which the worker selects the platform offering system 210 (e.g., taking the path 710), the worker may receive offers (step 718). For example, the platform offering system 210 may offer an order, a plurality of individual orders, or a bundle to the worker, a process described above in connection with the platform offering system 210 of FIG. 2. In some embodiments, each of the offers may include an option for the worker to accept or deny the offer.

In the example shown, the worker may accept one or more offers (step 720). For example, the worker may select (e.g., touch, select, or input a voice command) one or more of the offers received from the platform offering system 210.

In the example shown, the worker may receive one or more order assignments (step 722). For example, the worker may receive order assignments corresponding to the offers accepted by the worker.

Returning to the case in which the worker selects the open order system 212 (e.g., taking the path 708), the worker may view orders (step 724). For example, the worker may view one or more orders offered by the open order system 212. In some embodiments, each of the orders may include an option for the worker to claim the order. In some embodiments one or more of the orders may have an incentive applied to it, such as a price increase because the order is at-risk of being late.

In the example shown, the worker may claim one or more orders (step 726). For example, the worker may claim one or more orders displayed by the open order system 212. To do so, the worker may click on an input field to claim the offer or otherwise interact with the mobile application 119.

In the example shown, the worker may receive an order assignment for each of the orders claimed by the worker (step 728).

Following the steps 716, 722, and 728, the worker may be assigned to one or more orders. For each of the one or more assigned orders, the worker may perform the order or, optionally, drop the order or fail to perform the order.

For example, the worker may perform the order (step 730) by, in some embodiments, selecting an option in the mobile application 119 for beginning to perform the order. The tasks of the order will vary by order type. For example, if the order is a delivery order, then the worker may pick up and drop off items to perform the order. If the order is to install a light fixture, then the worker may go to a work location and install the light fixture. In some embodiments, the worker may confirm that the order has been performed (e.g., by selecting an option in the mobile application 119, uploading a photo to certify that the order has been performed, or performing another action). In some embodiments, order data may be updated after the worker has already been assigned to the order. In such instances, the work distribution platform 104 may receive the order updates and push the updates to the device associated with the assigned worker. In some instances, the work distribution platform 104 may increase a price for the order in response to the updates (e.g., if the customer associated with the order added a task to the order).

In the example shown, the worker may drop an order (step 732). For example, rather than performing an assigned order, the worker may drop it or fail to complete it. In some embodiments, if a worker drops an order, then the work distribution platform 104 may use one or more of the matching systems 206 to match the dropped order with a new worker. The matching system selected by the work distribution platform 104 may depend on how much time remains until a completion time of the order. As an example, if an order is dropped at 9:00 AM and has a completion window that starts at 10:00 AM, then the work distribution platform 104 may use the worker offering system 208 to receive offers from workers for the order; however, if the same order had been dropped at 9:30 AM, then the work distribution platform 104 may use the open order system to make the order available for a plurality of workers to claim. Alternative timing is also possible, and the work distribution platform 104 may also select a matching system based on considerations apart from timing. In some embodiments, if a worker drops an order, then the work distribution platform 104 may prevent the worker from being matched with the same order. In some embodiments, when a worker drops an order, a training instance for a machine learning model may be generated that includes characteristics of the worker and order and an indication that the order was dropped.

Figure 8:
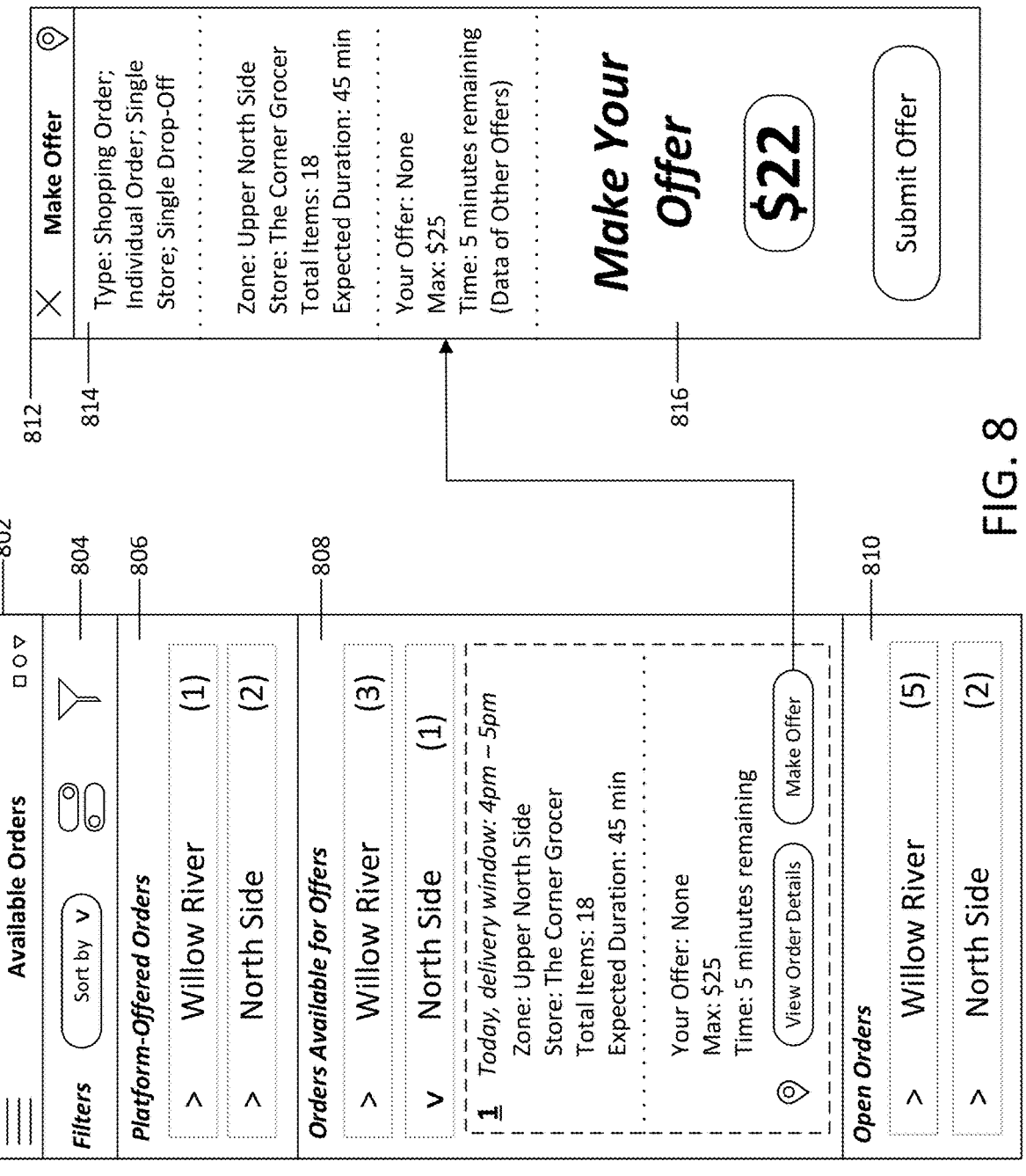
FIG. 8 illustrates an example user interface.

FIG. 8 illustrate example user interfaces of the mobile application 119 or another frontend system communicatively coupled with the work distribution platform 104. The user interfaces depicted in the example of FIG. 8 may be displayed to an example worker of the workers 108*a-x*. The example of FIG. 8 includes a user interface 802 that includes an order filter region 804, a platform-offered orders region 806, a region 808 for orders available for offers, and an open orders region 810. The example of FIG. 8 further includes a user interface 812 that includes an order details region 814, and an offer input region 816.

The user interface 802 may be displayed on a screen of the mobile devices 108*a-x*. In some embodiments, the mobile application 119 may display the user interface 802 in response to a worker selecting an option to view available orders. The user interface 802 includes display regions corresponding to different matching systems. In some embodiments, the matching systems displayed by the user interface 802 correspond with the matching systems 206 of the work distribution platform 104. For example, the platform-offered orders region 806 may correspond with the platform offering system 210; the region 808 for orders available for offers may correspond with the worker offering system 208; and the open orders region 810 may correspond with the open order system 212. In some embodiments, a worker may use the filters region 804 to sort orders by a characteristic (e.g., region, order type, order size, time, or other order characteristics), toggle order visibility by characteristic, or apply another filter.

In the platform-offered orders region 806, the worker may view and interact with orders offered by the platform offering system 210. In the example shown, the platform-offered orders region 806 indicates that the platform offering system 210 has offered an example worker three orders: one in a "Willow River" region and two in a "North Side" region. In some embodiments, the worker may select one of the regions to view the offered orders, and the worker may select an option to accept or deny the order.

In the region 808 with orders available for offers, the worker offering system 208 may provide three orders in Willow River for which the example worker may submit an offer and one order in the North Side for which the example worker may submit an offer. As shown, when a region is selected (e.g., North Side) the available orders may be displayed. As shown, details for the order in the North Side region may be displayed. Furthermore, an option to view a map of the order, to view more order details, and to make an offer may be displayed. In some embodiments, if the example worker selects the "Make Offer" button, then the mobile application 119 may allow the example worker to submit an offer for the order (e.g., the mobile application 119 may display the user interface 812).

In the open orders region 810, the open order system 212 may provide a plurality of orders that may be claimed by the example worker. In the example shown, the open order system 212 may provide five orders in the Willow River region and two orders in the North Side region. In response to a selection in the open orders region 810, the user interface 802 may display details for orders that are available to be claimed using the open order system 212, including a model-determined price and whether a price increase (e.g., incentive) is applied to the price.

The user interface 812 may be displayed by the mobile application in response to a selection of an option in the region 808 of orders available for offers. The user interface 812 includes an order details region 814 that may include details for the order for which the example workers wants to make an offer. The order details may include some of the order information displayed in the user interface 802 for the order. In the example shown, the order details region 814 includes an order type (e.g., that the order is a single shopping order with a single store pickup and a single drop-off), a zone (e.g., a subpart of a the North Side region), a store, a number of items, an expected duration time, a current offer by the worker for the order, a maximum offer price for the order, and a time left that the order is available to receive offers. Other order details may also be displayed. For example, in some embodiments, information related to other offers for the order may be displayed (e.g., offers made by other workers).

The offer input region 816 may include one or more input fields for the example worker to input an offer. In the example shown, the offer input region includes an input field for the example worker to input an offer price and to submit an offer. Other inputs fields are also possible, such as a field for inputting the lowest price that the worker is willing to accept to perform the order. In some embodiments, aspects of the user interface 812 may displayed in the user interface 802. For example, the user interface 802 may include an input field for a worker to input an offer price for an order and submit an offer for the order.

Figure 9:
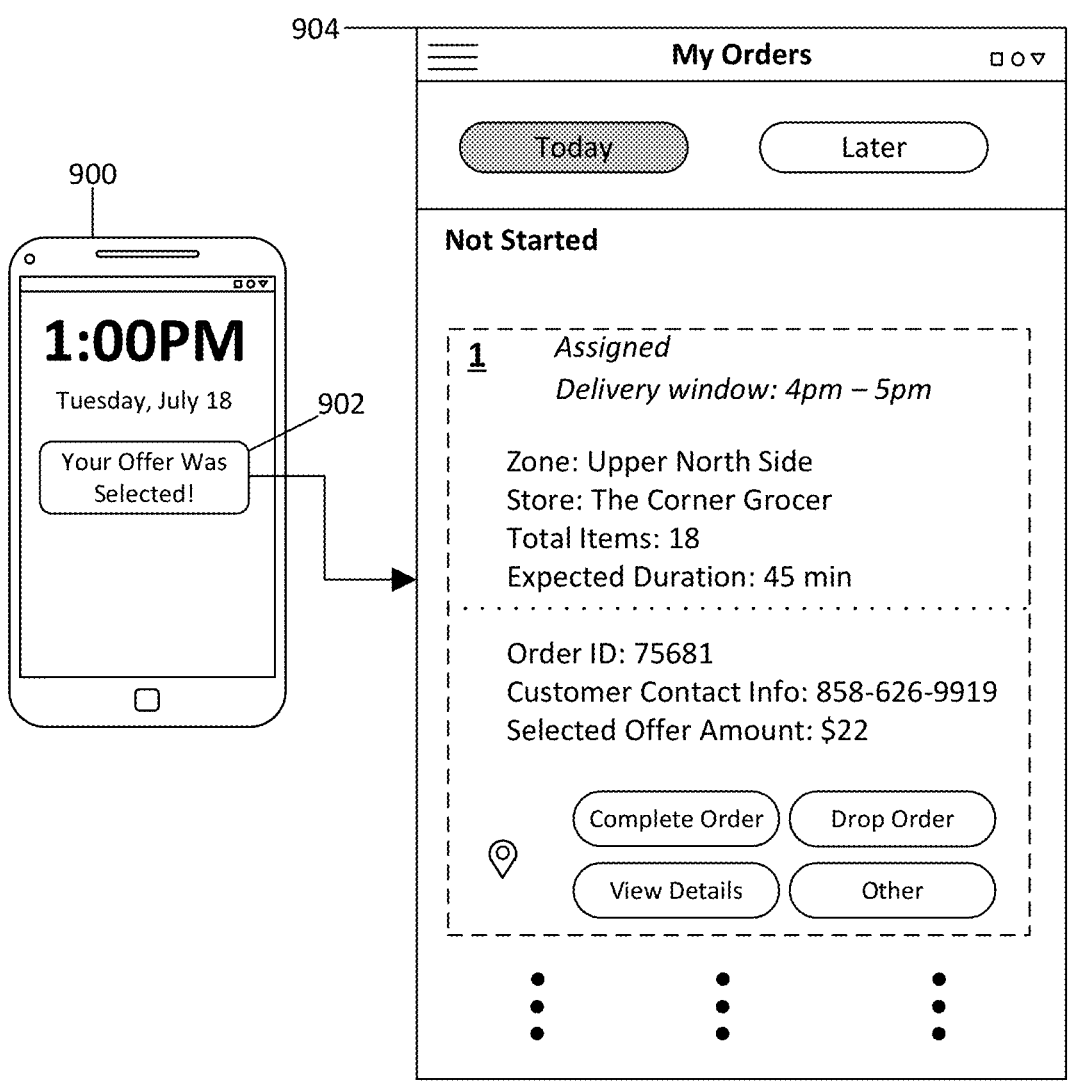
FIG. 9 illustrates an example user interface.

In some embodiments, once the time remaining to submit an offer for the order expires, one or more of the user interfaces 824 or 812 may be updated by the work distribution platform 104 to remove data related to the order. If the example worker's offer for the order is selected, information for the order may reappear, as illustrated in the example of FIG. 9. In some instances, however, if no offers were submitted for the order, then the order may be offered by a different matching system, and data related to the order may appear in a different region of the user interface 802.

FIG. 9 illustrates an example mobile device 900 and a user interface 904. The mobile device 900 may be an example mobile device of the mobile devices 108*a-x*. The mobile device 900 may be associated with an example worker described in connection with FIG. 8. In the example shown, the mobile device 900 includes a screen displaying a notification 902. In some embodiments, the notification 902 may be a push notification sent by the mobile application 119. In the example shown, the notification 902 alerts the example user that the example user's offer was selected. For example, the worker offering system 208 may have selected the example worker's offer input via the user interface 812 of FIG. 8, and the worker offering system 208 may have caused the mobile application 119 to generate and push the notification 902.

In some embodiments, selecting the notification 902 may open the mobile application 119, which may display the user interface 904. The user interface 904 may include orders assigned to the example worker. In some embodiments, the user interface 904 may include a list of assigned orders. In examples, the user interface 904 may also include options for workers to view orders that are to be performed today and future orders. For each assigned order, the user interface 904 may include order details, as shown by the example of FIG. 9. Furthermore, the user interface 904 may include one or more selectable options for each assigned order. The options may include, for example, an option to complete the order, drop the order, view more order details, contact support, contact a customer, view a map, or perform another operation.

Figure 10:
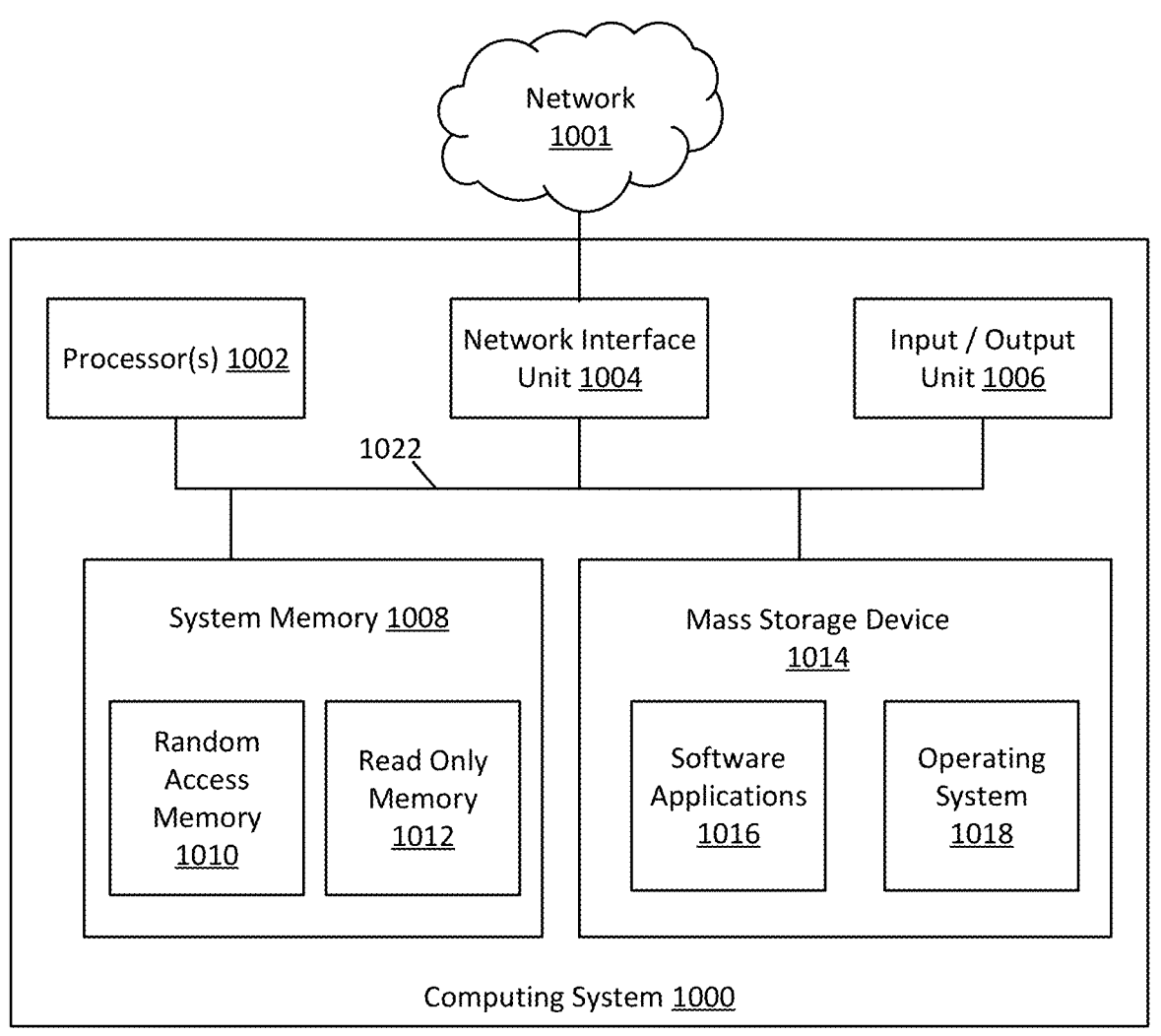
FIG. 10 is a block diagram of an example computing system.

FIG. 10 illustrates an example block diagram of a virtual or physical computing system 1000. One or more aspects of the computing system 1000 can be used to implement the system and processes described herein.

In the embodiment shown, the computing system 1000 includes one or more processors 1002, a system memory 1008, and a system bus 1022 that couples the system memory 1008 to the one or more processors 1002. The system memory 1008 includes RAM (Random Access Memory) 1010 and ROM (Read-Only Memory) 1012. A basic input/output system that contains the basic routines that help to transfer information between elements within the computing system 1000, such as during startup, is stored in the ROM 1012. The computing system 1000 further includes a mass storage device 1014. The mass storage device 1014 is able to store software instructions and data. The one or more processors 1002 can be one or more central processing units or other processors.

The mass storage device 1014 is connected to the one or more processors 1002 through a mass storage controller (not shown) connected to the system bus 1022. The mass storage device 1014 and its associated computer-readable data storage media provide non-volatile, non-transitory storage for the computing system 1000. Although the description of computer-readable data storage media contained herein refers to a mass storage device, such as a hard disk or solid-state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1000.

According to various embodiments of the invention, the computing system 1000 may operate in a networked environment using logical connections to remote network devices through the network 1001. The network 1001 is a computer network, such as an enterprise intranet and/or the Internet. The network 1001 can include a LAN, a Wide Area Network (WAN), the internet, wireless transmission mediums, wired transmission mediums, other networks, and combinations thereof. The computing system 1000 may connect to the network 1001 through a network interface unit 1004 connected to the system bus 1022. It should be appreciated that the network interface unit 1004 may also be utilized to connect to other types of networks and remote computing systems. The computing system 1000 also includes an input/output controller 1006 for receiving and processing input from a number of other devices, including a touch user interface display screen, or another type of input device. Similarly, the input/output controller 1006 may provide output to a touch user interface display screen or other type of output device.

As mentioned briefly above, the mass storage device 1014 and the RAM 1010 of the computing system 1000 can store software instructions and data. The software instructions include an operating system 1018 suitable for controlling the operation of the computing system 1000. The mass storage device 1014 and/or the RAM 1010 also store software instructions, that when executed by the one or more processors 1002, cause one or more of the systems, devices, or components described herein to provide functionality described herein. For example, the mass storage device 1014 and/or the RAM 1010 can store software instructions that, when executed by the one or more processors 1002, cause the computing system 1000 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A platform comprising:
a first matching system;
a second matching system;
a processor; and
a memory storing instructions that, when executed by the processor, cause the platform to:
    receive a plurality of orders;
    predict a price for a first order of the plurality of orders using a machine learning model trained, using training data comprising historical order characteristics and historical order prices, to predict prices;
    provide, using the first matching system, the first order of the plurality of orders to a plurality of workers;
    receive, using the first matching system, a plurality of offers for the first order;
    select, using the first matching system, an offer from the plurality of offers for the first order;
    based on the selected offer, select, using the first matching system, a first worker of the plurality of workers;
    assign the first order to the first worker;
    receive, from a mobile device of the first worker, data indicating that the first worker dropped the first order;
    responsive to receiving the data indicating that the first worker dropped the first order:
        generate a training instance comprising order characteristics of the first order and an indication that the first worker dropped the first order;
        batch the training instance with a second training instance generated for a third order receiving no offers; and
        retrain, using a data set comprising the training instance and the second training instance, the machine learning model;
    predict, using the retrained machine learning model, a second price for a second order;
    offer, using the second matching system, the second order to a second worker of the plurality of workers using the predicted second price;
    receive, using the second matching system, an acceptance of the second order from the second worker; and
    assign the second order to the second worker.

2. The platform of claim 1,
wherein each offer of the plurality of offers includes an offer price; and
wherein selecting, using the first matching system, the offer from the plurality of offers for the first order includes selecting the offer based on a lowest offer price.

3. The platform of claim 1,
wherein providing, using the first matching system, the first order of the plurality of orders to the plurality of workers comprises setting a maximum price for the plurality of offers for the first order, the maximum price being set based at least in part on a base price of the first order; and
wherein providing, using the second matching system, the second order of the plurality orders to the second worker of the plurality of workers comprises offering the second order at a base price of the second order.

4. The platform of claim 3,
wherein the base price of the first order is based at least in part on an estimated completion time of the first order; and
wherein the base price of the second order is based at least in part on an estimated completion time of the second order.

5. The platform of claim 3,
wherein the base price of the first order is determined by an order appraiser machine learning model;
wherein the base price of the second order is determined by the order appraiser machine learning model; and
wherein the instructions, when executed by the processor, further cause the platform to update the order appraiser machine learning model using data of the first order and at least some offers of the plurality of offers for the first order.

6. The platform of claim 1, further comprising a third matching system;
wherein the third matching system is different from the first matching system;
wherein the third matching system is different from the second matching system;
wherein the first matching system is different from the second matching system; and
wherein the instructions, when executed by the processor, further cause the platform to:
    offer, using the third matching system, a fourth order of the plurality of orders to the plurality of workers;
    receive, using the third matching system, a claim of the fourth order from a third worker of the plurality of workers; and
    assign the fourth order to the third worker.

7. The platform of claim 1, wherein the instructions, when executed by the processor, further cause the platform to, prior to providing, using the first matching system, the first order of the plurality of orders to the plurality of workers:
    generate a bundle of orders, the bundle of orders including the first order;
    provide, using the first matching system, the bundle to the plurality of workers; and
    in response to receiving zero offers from the plurality of workers for the bundle, unbundling the first order from the bundle.

8. The platform of claim 1, wherein the instructions, when executed by the processor, further cause the platform to:
    match, without using the first matching system, the first order with a third worker of the plurality of workers;
    wherein matching, without using the first matching system, the first order with the third worker of the plurality of workers comprises matching the first order with the third worker using the second matching system or a third matching system.

9. The platform of claim 1,
wherein providing, using the first matching system, the first order of the plurality of orders to the plurality of workers causes a user interface of a mobile application to display data of the first order in a first region of the user interface; and
wherein offering, using the second matching system, the second order of the plurality of orders to the second worker of the plurality of workers causes the user interface of the mobile application to display data of the second order in a second region of the user interface.

10. The platform of claim 1, wherein the first worker is the second worker.

11. The platform of claim 1, wherein the first order is a first shopping order or a first delivery order; and wherein the second order is a second shopping order or a second delivery order.

12. A platform comprising:

a first matching system;

a second matching system;

a processor; and memory, the memory storing instructions that, when executed by the processor, cause the platform to:

receive an order;

predict a base price for the order using a machine learning model trained, using training data comprising historical order characteristics and historical order prices, to predict prices;

select the first matching system;

provide, using the first matching system, the order to a plurality of workers;

at an end of an offer acceptance window defined by the first matching system, determine whether any worker of the plurality of workers submitted an offer for the order;

in response to receiving zero offers for the order, select the second matching system;

offer, using the second matching system, the order at the base price to the plurality of workers;

receive, using the second matching system, a claim of the order from a worker of the plurality of workers;

assign the order to the worker;

after receiving zero offers for the order:

generate a training instance comprising order characteristics of the order and an indication that the order received zero offers;

batch the training instance with a plurality of training instances generated for a plurality of offered orders; and retrain, using a data set comprising the training instance and the plurality of offered orders, the machine learning model;

predict, using the retrained machine learning model, a price for a second order; and using the price for the second order, offer the second order to a second worker of the plurality of workers.

13. The platform of claim 12, wherein the instructions, when executed by the processor, further cause the platform to, prior to receiving, using the second matching system, the claim of the order from the worker of the plurality of workers, increase the base price in response to determining that the order is at risk of being late.

14. The platform of claim 12, wherein providing, using the first matching system, the order to the plurality of workers comprises defining a maximum offer price for the order based at least in part on the base price for the order.

15. The platform of claim 12, wherein providing, using the first matching system, the order to the plurality of workers causes a user interface of a mobile application used by the plurality of workers to display order data and an offer input field for the order in a first region of the user interface;

wherein the instructions, when executed by the processor, further cause the platform to, at the end of the offer acceptance window, remove order data and the offer input field for the order from the first region of the user interface; and wherein offering, using the second matching system, the order at the base price to the plurality of workers causes the user interface of the mobile application used by the plurality of workers to display the order data and a claim order input field for the order in a second region of the user interface.

16. The platform of claim 12, wherein the end of the offer acceptance window defined by the first matching system is between fifteen and forty-five minutes prior to a completion time of the order.

17. The platform of claim 12, wherein the instructions, when executed by the processor, further cause the platform to:

after assigning the order to the worker, receive an order update;

based on the order update, increase the base pay for the order; and notify the worker of the order update.

18. A method comprising:

selecting a first matching system of a plurality of matching systems;

receiving a plurality of orders;

selecting an order of the plurality of orders;

predicting a price for the order using a machine learning model trained, using training data comprising historical order characteristics and historical order prices, to predict prices;

providing, using the first matching system, the order to a plurality of workers;

receiving, using the first matching system, a plurality of offers for the order, each of the plurality of offers including an offer price;

at an end of an offer acceptance window, selecting an offer of the plurality of offers based on the selected offer having a lowest offer price;

assigning the order to a worker of the plurality of workers, wherein the worker submitted the selected offer;

receiving, from a mobile device of the worker, data indicating that the worker dropped the first order;

responsive to receiving the data indicating that the worker dropped the order:

generating a training instance comprising order characteristics of the order and an indication that the worker dropped the first order;

batching the training instance with a second training instance generated for a third order receiving no offers; and retraining, using a data set comprising the training instance and the second training instance, the machine learning model;

predicting, using the retrained machine learning model, a second price for a second order;

providing, using the first matching system, the second order to a second worker of the plurality of workers using the predicted second price.

19. The method of claim 18, further comprising:

notifying the worker of an assignment of the order by pushing a notification to a mobile device of the worker; and prior to selecting the offer of the plurality of offers based on the selected offer having the lowest offer price, receiving an update to the selected offer, the update causing the selected offer to have the lowest offer price;

wherein providing the order to the plurality of workers comprises displaying, via a user interface of a mobile application used by the plurality of workers, order data for the order, the price for the order, and a submit offer input field.

20. The method of claim 18, further comprising:

providing a third order of the plurality of orders to the plurality of workers, wherein providing the third order of the plurality of orders to the plurality of workers comprises displaying order details of the third order with the first order in a user interface of a mobile application used by the plurality of workers; and at the end of the offer acceptance window, selecting a second offer of the plurality of offers based on the selected second offer having a lowest offer price for the third order.

\*    \*    \*    \*    \*